(12) United States Patent
Babaei et al.

(10) Patent No.: US 10,687,248 B2
(45) Date of Patent: Jun. 16, 2020

(54) PACKET DUPLICATION ACTIVATION AND DEACTIVATION

(71) Applicants: Alireza Babaei, Fairfax, VA (US);
Esmael Dinan, Herndon, VA (US);
Kyungmin Park, Herndon, VA (US);
Hua Zhou, Herndon, VA (US);
Hyoungsuk Jeon, Centreville, VA (US)

(72) Inventors: Alireza Babaei, Fairfax, VA (US);
Esmael Dinan, Herndon, VA (US);
Kyungmin Park, Herndon, VA (US);
Hua Zhou, Herndon, VA (US);
Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/141,390

(22) Filed: Sep. 25, 2018

(65) Prior Publication Data
US 2019/0098533 A1   Mar. 28, 2019

Related U.S. Application Data

(60) Provisional application No. 62/562,827, filed on Sep. 25, 2017.

(51) Int. Cl.
*H04W 28/06* (2009.01)
*H04L 1/18* (2006.01)
*H04W 72/04* (2009.01)
*H04L 1/08* (2006.01)
*H04W 76/15* (2018.01)

(52) U.S. Cl.
CPC ............ *H04W 28/06* (2013.01); *H04L 1/08* (2013.01); *H04L 1/1854* (2013.01); *H04L 1/1861* (2013.01); *H04W 72/0413* (2013.01); *H04W 76/15* (2018.02)

(58) Field of Classification Search
CPC ........................ H04W 72/14; H04L 1/1874
See application file for complete search history.

(56) References Cited

U.S. PATENT DOCUMENTS

2013/0010641 A1*  1/2013  Dinan ............... H04W 36/0072
                                              370/254
2013/0010716 A1*  1/2013  Dinan ................... H04W 76/15
                                              370/329

(Continued)

OTHER PUBLICATIONS

3GPP TS 36.211 V14.3.0 (Jun. 2017); Technical Specification; 3rd Generation Partnership Project; Technical Specification Group Radio Access Network; Evolved Universal Terrestrial Radio Access (E-UTRA);; Physical channels and modulation.

(Continued)

*Primary Examiner* — Melanie Jagannathan
(74) *Attorney, Agent, or Firm* — David Grossman; Kavon Nasabzadeh; Philip Smith

(57) ABSTRACT

A wireless device may receive one or more messages comprising a duplication configuration parameter for a bearer. A transport block may be received. The transport block may comprise a control element indicating activation of the duplication for the bearer. In response to receiving the control element, a cell with an uplink control channel may be interrupted. During the interrupting, a hybrid automatic repeat request feedback corresponding to the transport block may be transmitted via the cell.

20 Claims, 26 Drawing Sheets

(56) References Cited

U.S. PATENT DOCUMENTS

| | | | | |
|---|---|---|---|---|
| 2014/0119265 | A1* | 5/2014 | Shauh | H04W 4/06 370/312 |
| 2015/0382398 | A1* | 12/2015 | Guo | H04W 52/0206 370/328 |
| 2016/0302228 | A1* | 10/2016 | Kazmi | H04L 1/1887 |
| 2017/0013565 | A1* | 1/2017 | Pelletier | H04W 52/146 |
| 2017/0054568 | A1* | 2/2017 | Lee | H04W 16/32 |
| 2018/0092122 | A1* | 3/2018 | Babaei | H04L 1/1822 |
| 2018/0227805 | A1* | 8/2018 | Jang | H04W 72/1242 |
| 2018/0279168 | A1* | 9/2018 | Jheng | H04W 76/20 |
| 2018/0279262 | A1* | 9/2018 | Babaei | H04L 1/00 |
| 2018/0279401 | A1* | 9/2018 | Hong | H04J 11/0086 |
| 2018/0324641 | A1* | 11/2018 | Tsai | H04L 69/321 |
| 2018/0324651 | A1* | 11/2018 | Tenny | H04L 63/0428 |
| 2018/0368200 | A1* | 12/2018 | Jin | H04W 76/15 |
| 2019/0149307 | A1* | 5/2019 | Siomina | H04L 5/001 |
| 2019/0159274 | A1* | 5/2019 | Hong | H04W 76/15 |
| 2019/0254076 | A1* | 8/2019 | Siomina | H04L 5/00 |
| 2019/0268128 | A1* | 8/2019 | Zhou | H04L 5/0082 |
| 2019/0268818 | A1* | 8/2019 | Yi | H04W 36/08 |

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures; (Release 14).
3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.
3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.211 V0.2.0 (Aug. 2017); Technical Specification; 3rd Generation Partnership Project; Technical Specification Group Radio Access Network; NR; Physical channels and modulation; (Release 15).
3GPP TS 38.212 V0.1.0 (Aug. 2017); Technical Specification; 3rd Generation Partnership Project; Technical Specification Group Radio Access Network; NR; Multiplexing and channel coding; (Release 15).
3GPP TS 38.214 V0.1.0 (Aug. 2017); Technical Specification; 3rd Generation Partnership Project; Technical Specification Group Radio Access Network; NR; Physical layer procedures for data (Release 15).
3GPP TS 38321 V1.0.0 (Sep. 2017); Technical Specification; 3rd Generation Partnership Project; Technical Specification Group Radio Access Network; NR; Medium Access Control (MAC) protocol specification; (Release 15).
R2-1707705—Control on UL packet duplication for split bearer; 3GPP Tsg-RAN2 Meeting #99 R2-1707705; Berlin, Germany, Aug. 21-25, 2017; Agenda Item:10.2.2.3; Source:OPPO; Title:Control on UL packet duplication for split bearer.
R2-1707711—TP on out-of-sequence delivery from PDCP; 3GPP TSG-RAN2 Meeting #99; Berlin, Germany, Aug. 21-25, 2017; Agenda Item:10.3.3.3; Source:OPPO, Nokia, Nokia Shanghai Bell, Sequans, Ericsson; Title:TP on out-of-sequence delivery from PDCP.

R2-1707713 BSR procedure for data duplication ; 3GPP TSG RAN WG2 #99; Berlin, Germany, Aug. 21-25, 2017Update of R2-1706475; ; Agenda item:10.3.1.11; Source: Huawei, HiSilicon; Title: BSR procedure for data duplication.
R2-1707714 Link selection upon duplication deactivation; 3GPP TSG-RAN2 #99; Berlin, Germany, Aug. 21-25, 2017; Agenda item:10.3.1.11; Source: Huawei, HiSilicon; Title: Link selection upon duplication deactivation.
R2-1707715 Enhancements for DL packet duplication; 3GPP TSG-RAN2 #99; Berlin, Germany, Aug. 21-25, 2017; Agenda item:10.2.1.11; Source: Huawei, HiSilicon; Title: Enhancements for DL packet duplication.
R2-1707741—Details of the duplication control MAC CE; 3GPP TSG RAN WG2 #99; Berlin, Germany, Aug. 21-25, 2017; Agenda Item:10.3.1.11; Source:OPPO; Title:Details of the duplication control MAC CE.
R2-1707748 38300-060; 3GPP TS 38.300 V0.6.0 (Aug. 2017); Technical Specification; 3rd Generation Partnership Project; Technical Specification Group Radio Access Network; NR; NR and NG-RAN Overall Description; Stage 2.
R2-1707921; 3GPP TSG-RAN WG2 #99; Berlin, Germany, Aug. 21-25, 2017; Source:CATT ; Title:Duplication Activation/Deactivation MAC CE; Agenda Item:10.3.1.11.
R2-1708097 Stage-2 aspects of data duplication; 3GPP TSG-RAN WG2 #99; Berlin, Germany, Aug. 21-25, 2017Revised R2-1707260; ; Agenda Item:10.2.2.3; Souce:MediaTek Inc.; Title:Stage-2 aspects of data duplication.
R2-1708100 MAC impact of duplication discard; 3GPP TSG-RAN WG2 #99; Berlin, Germany, Aug. 21-25, 2017; ; Agenda Item:10.3.1.11; Souce:MediaTek Inc.; Title:MAC impact of duplication discard.
R2-1708102 MAC CE design for duplication; 3GPP TSG-RAN WG2 #99; Berlin, Germany, Aug. 21-25, 2017Revised R2-1707262; Agenda Item:10.3.1.11; Souce:MediaTek Inc.; Title:MAC CE design for duplication.
R2-1708331—MAC CE details for PDCP data activation and deactivation; 3GPP TSG-RAN WG2 #99; Berlin, Germany, Aug. 21-25, 2017; Agenda Item:10.3.1.11; Source:Ericsson; Title: MAC CE details for activation and deactivation of PDCP data duplication.
R2-1708333—Packet duplication in CA; 3GPP TSG-RAN WG2 #99; Berlin, Germany, Aug. 21-25, 2017Updated from R2-1707172; Agenda Item:10.2.2.3; Source:Ericsson; Title: Packet duplication in CA.
R2-1708468 38331-005; 3GPP TS 38.331 V0.0.5 (Aug. 2017); Technical Specification; 3rd Generation Partnership Project; Technical Specification Group Radio Access Network; NR Radio Resource Control (RRC).
R2-1708489 Duplication deactivation due to Scell or BWP deactivation; 3GPP TSG-RAN WG2 Meeting #99; Berlin, Germany, Aug. 21-25, 2017; Source: vivo; Title:Duplication deactivation due to Scell or BWP deactivation; Agenda Item:10.2.2.3; Document for:Discussion and Decision.
R2-1708499 Discussion on the bearer type change of duplicate bearer, 3GPP TSG-RAN WG2 Meeting #99; Berlin, Germany, Aug. 21-25, 2017; Source: vivo; Title:Discussion on the bearer type change of duplicate bearer; Agenda Item:10.2.2.2.
R2-1708502 PDCP duplication impacts on LCP; 3GPP TSG-RAN WG2 Meeting #99; Berlin, Germany, Aug. 21-25, 2017 revision of R2-1707074; Source:vivo ; Title:PDCP duplication impacts on LCP; Agenda Item:10.11.11.
R2-1708691 Remaining stage 2 issues for CA duplication and for DC duplication; 3GPP TSG-RAN WG2 Meeting #99; Berlin, Germany, Aug. 21-25, 2017; ; Agenda Item:10.2.2.3; Source: Huawei, HiSilicon; Title:Remaining stage 2 issues for CA duplication and for DC duplication.
R2-1708735 (R15 NR WI A10223 Duplication on SRB); 3GPP RAN WG2 Meeting #99; Berlin, Germany Aug. 21-25, 2017; Agenda Item:10.2.2.3; Source:InterDigital Inc.; Title:Details of Duplication and Routing for SRB; Document for:Discussion, Decision.
R2-1708769 MAC details on Duplication activation deactivation; 3GPP TSG-RAN WG2 #99; Berlin, Germany, Aug. 21-25, 2017; Agenda item:x.x.x; Source:Nokia, Nokia Shanghai Bell.

(56) References Cited

OTHER PUBLICATIONS

R2-1708821; 3GPP TSG-RAN WG2 NR Meeting #99; Berlin, Germany, Aug. 21-25, 2017 ; Agenda item:10.2.2.3; Source:Intel Corporation; Title:Support of CA packet duplication for RLC AM.
R2-1708862 Stage 2 TP for RLC AM duplication; 3GPP TSG-RAN WG2 #99R2-1708862 Berlin, Germany, Jun. 21-25, 2017; Agenda Item:10.2.2.3 (Packet duplication); Source: Fujitsu; Title:Stage 2 TP for RLC AM duplication; Document for:Decision.
R2-1708950; 3GPP TSG-RAN WG2 Meeting #99; Berlin, Germany, Aug. 21-25, 2017; ; Agenda item:10.2.2.3; Source:Qualcomm Incorporated; Title:Further considerations for Packet duplication.
R2-1709029 MAC CE for Duplication Activation; 3GPP TSG-RAN WG2 Meeting #99; Berlin, Germany, Aug. 21-25, 2017; Agenda item:10.3.1.11; Source:Samsung; Title:MAC CE for Activation/Deactivation of PDCP Duplication; Document for:Discussion & Decision.
R2-1709036 UL Duplication; 3GPP TSG-RAN WG2 #99; Berlin, Germany, Aug. 21-25, 2017; ; Agenda item:10.2.2.3; Source:Samsung; Title:Uplink DRB Duplication.
R2-1709077 SCG Failure Case for Duplication SRB; 3GPP TSG-RAN WG2 Meeting #99; Berlin, Germany, Aug. 21-25, 2017; Agenda item:10.2.2.3; Source:ITRI; Title:SCG Failure Case for Duplication SR.
R2-1709095 Need for Duplicate RB; 3GPP TSG-RAN WG2 #99; Berlin, Germany, Aug. 21-Aug. 25, 2017; Agenda item:10.2.2.3 (NR_newRAT-Core); Source:LG Electronics Inc.
R2-1709096 Packet duplication with implicit SCell deactivation; 3GPP TSG-RAN WG2 #99; Berlin, Germany, Aug. 21-Aug. 25, 2017Resubmission of R2-1706867; Agenda item:10.3.1.11 (NR_newRAT-Core); Source:LG Electronics Inc.
R2-1709102 Cell Deactivation impact on PDCP duplication; 3GPP TSG-RAN WG2 AdHoc; Qingdao, China, Jun. 27-29, 2017; Agenda Item:10.3.1.11; Source: Huawei, HiSilicon; Title: Cell deactivation impact on PDCP dulication.
R2-1709118 Impact of PDCP Duplication on BSR in the CA case; 3GPP TSG-RAN WG2 Meeting RAN2 #99; Berlin, Germany, Aug. 21-25, 2017(updated R2-1706526) ; Agenda item:10.3.1.11; Source:Qualcomm Incorporated; Title:Impact of PDCP Duplication on BSR Procedure in the CA case.
R2-1709327 PDCP duplication and SCell (de-)activation. DOC3GPP TSG-RAN WG2 Meeting #99R2-1709327 Berlin, Germany, Aug. 21-25, 2017 ; Agenda Item:10.3.1.11; Source: ASUSTeK; Title:PDCP duplication and SCell (de-)activation.
R2-1709425 More consideration on uplink duplication in dual connectivity; 3GPP TSG-RAN WG2 #99; Berlin, Germany, Aug. 21-25, 2017; Agenda item:10.2.2.3; Source:Nokia, Nokia Shanghai Bell.
R2-1709628; 3GPP TSG-RAN WG2 Meeting #99; Berlin, Germany, Aug. 21-Aug. 25, 2017; Agenda Item:10.2.2.3; Source: ITL; Title: Configuration of PDCP duplication ; Document for:Discussion and decision.
R2-1709629; 3GPP TSG-RAN2 Meeting #99; Berlin, Germany, Aug. 21-Aug. 25, 2017; Agenda Item:10.3.1.11; Source: ITL; Title: MAC CE design for activation/deactivation of PDCP duplication; Document for:Discussion and decision.

\* cited by examiner

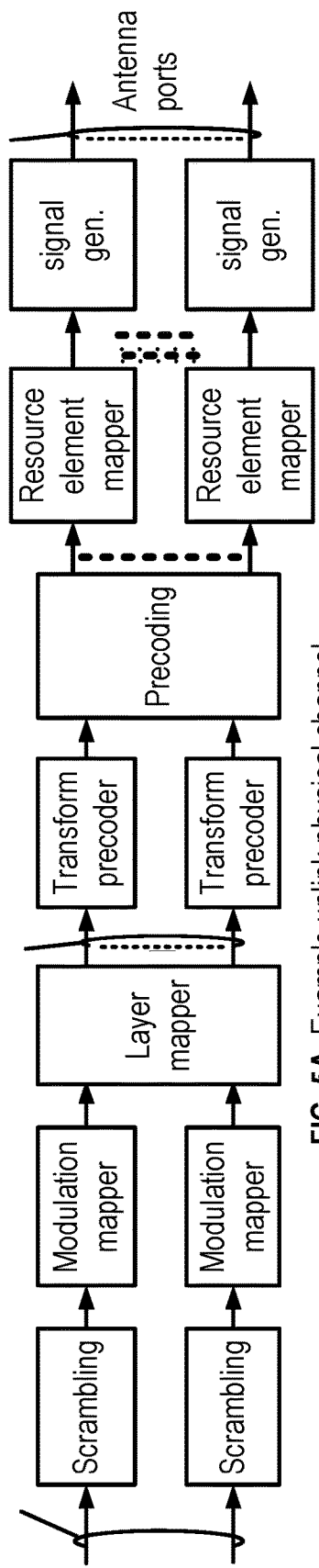
FIG. 5A Example uplink physical channel
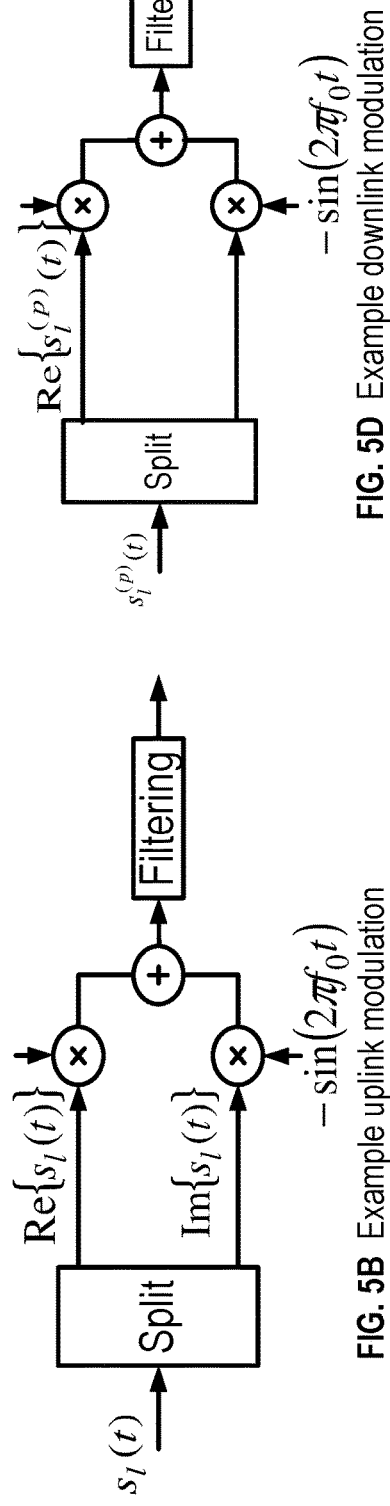
FIG. 5B Example uplink modulation
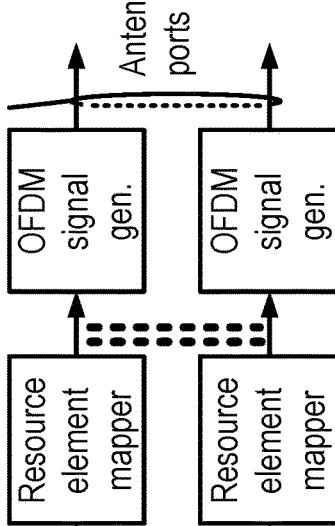
FIG. 5D Example downlink modulation
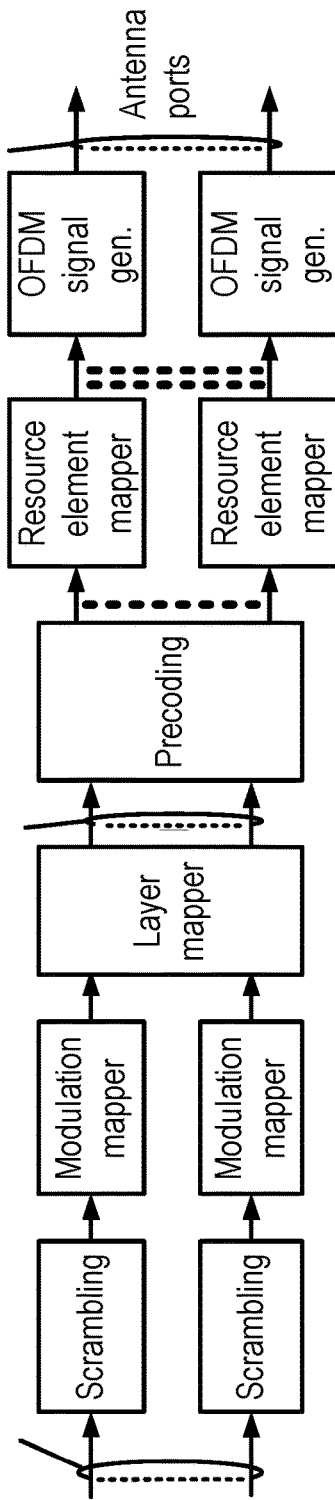
FIG. 5C Example downlink physical channel FIG. 7 Dual-Connectivity- two MAC entities at UE side

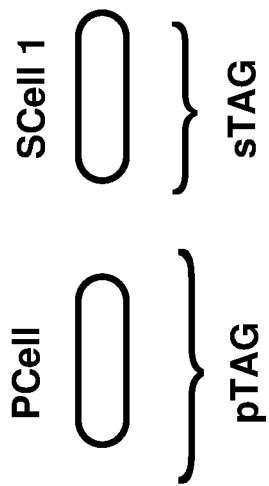
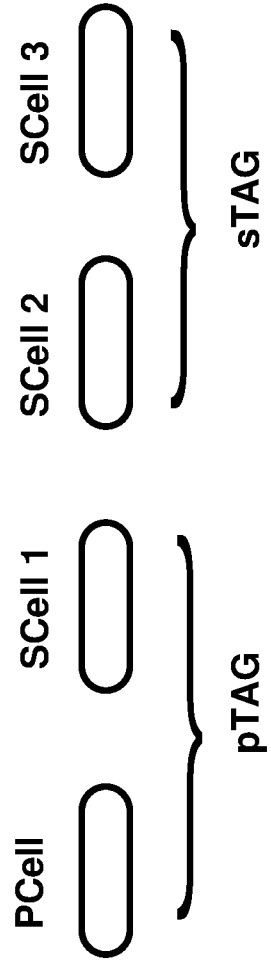
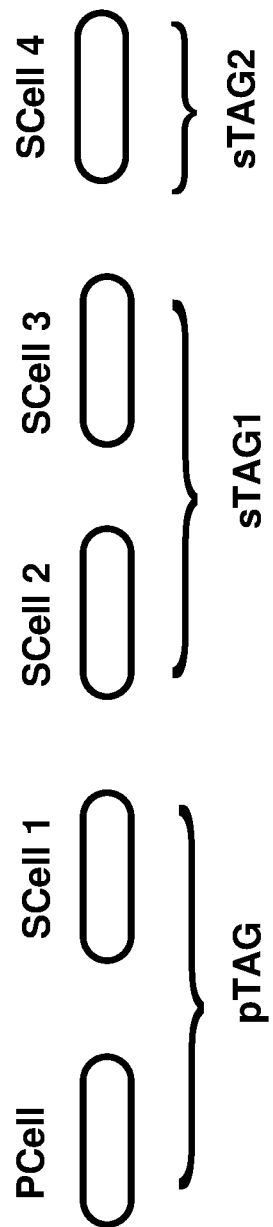
FIG. 8

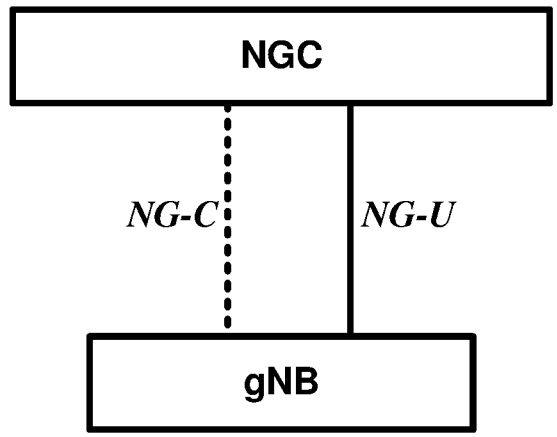
FIG. 10A  gNB connected to NGC
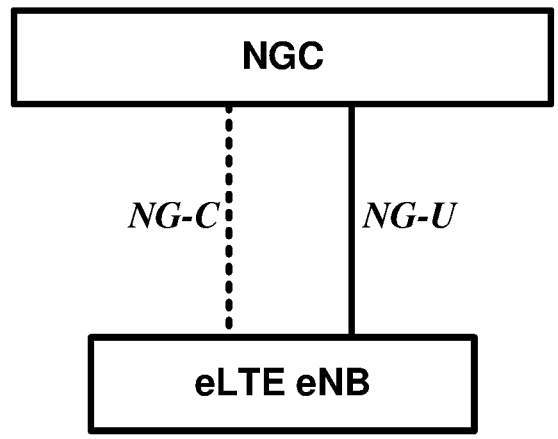
FIG. 10B  eLTE eNB connected to NGC

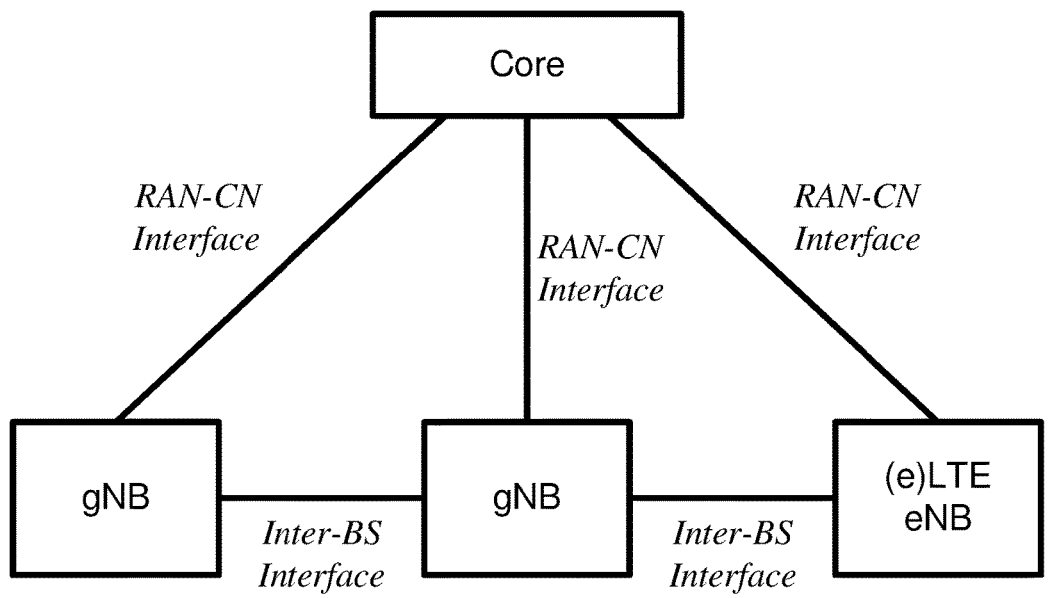
FIG. 13A Non-centralized deployment
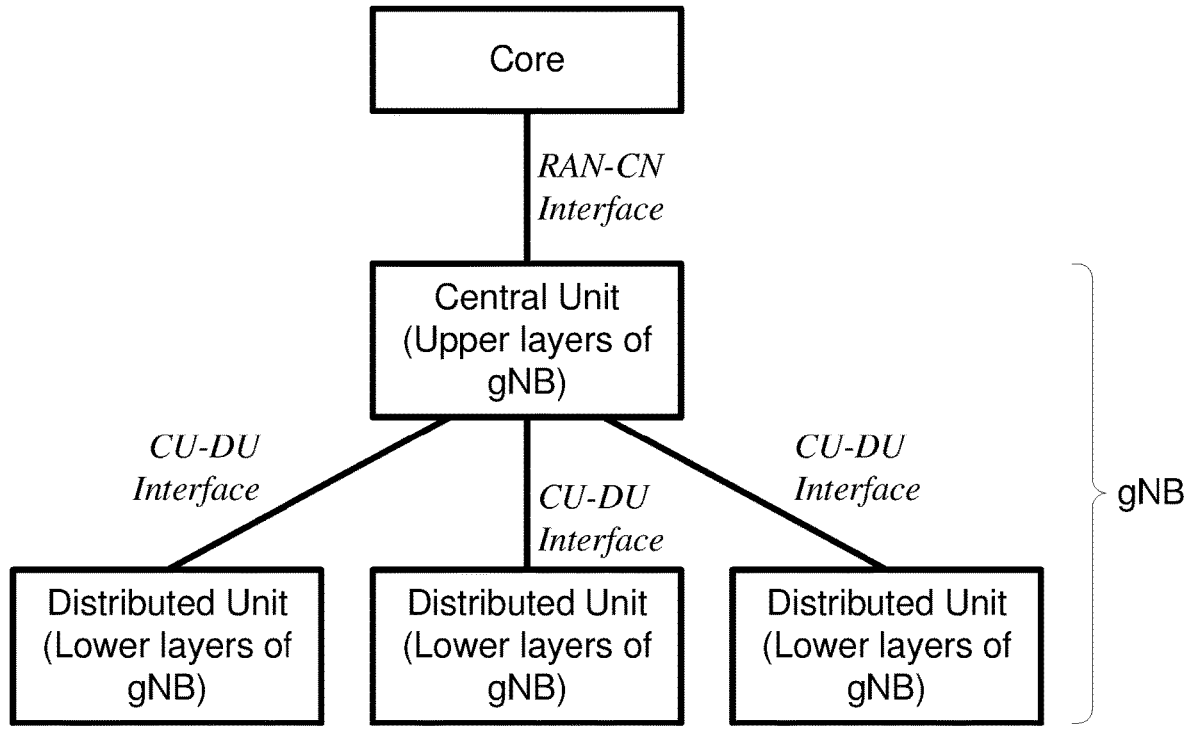
FIG. 13B Centralized deployment

Receive, by a wireless device, message(s) comprising: a duplication configuration parameter of a bearer associated with a 1st logical channel and a 2nd logical channel; 1st configuration parameters indicating that the 1st logical channel is mapped to 1st cell(s) having 1st priorit(ies); and 2nd configuration parameters indicating that the 2nd logical channel is mapped to 2nd cell(s) having 2nd priorit(ies)
2410

Select, a 1st activated cell in the 1st cell(s) based on the 1st priorit(ies)
2420

Select a 2nd activated cell in the 2nd cell(s) based on the 2nd priorit(ies)
2430

Transmit a 1st packet corresponding to the bearer via the 1st activated cell
2440

Transmit a duplicate packet of the 1st packet via the 2nd activated cell
2450

FIG. 24

Receive, by a wireless device, message(s) comprising: a duplication configuration parameter of a bearer associated with a 1st logical channel and a 2nd logical channel; 1st configuration parameters indicating that the 1st logical channel is mapped to a 1st cell; and 2nd configuration parameters indicating that the 2nd logical channel is mapped to a 2nd cell
2510

Receive a control element indicating activation of duplication for the bearer
2520

Maintain activation of the 2nd cell based on arrival or availability of data at buffer(s) associated with the 2nd logical channel
2530

Transmit a 1st packet corresponding to the bearer via the 1st cell
2540

Transmit a duplicate of the 1st packet via the 2nd cell in response to the 2nd cell being activated
2550

FIG. 25

Receive, by a wireless device, message(s) comprising: a duplication configuration parameter of a bearer associated with a 1st logical channel and a 2nd logical channel; 1st configuration parameters indicating that the 1st logical channel is mapped to a 1st cell; and 2nd configuration parameters indicating that the 2nd logical channel is mapped to a 2nd cell
2610

Receive a control element indicating activation of the duplication for the bearer
2620

Storing a value associated with a timer of the 2nd cell in response to receiving the 1st control element
2630

Receive a 2nd control element indicating deactivation of the duplication for the bearer
2640

Start the timer with a 1st value
2650

PACKET DUPLICATION ACTIVATION AND DEACTIVATION

This application claims the benefit of U.S. Provisional Application No. 62/562,827, filed Sep. 25, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 13A and FIG. 13B are example diagrams for gNB deployment scenarios as per an aspect of an embodiment of the present invention.

FIG. 24 is a flow diagram of an aspect of an embodiment of the present disclosure.

FIG. 25 is a flow diagram of an aspect of an embodiment of the present disclosure.

FIG. 26 is a flow diagram of an aspect of an embodiment of the present disclosure.

DETAILED DESCRIPTION OF EMBODIMENTS

Figure 1:
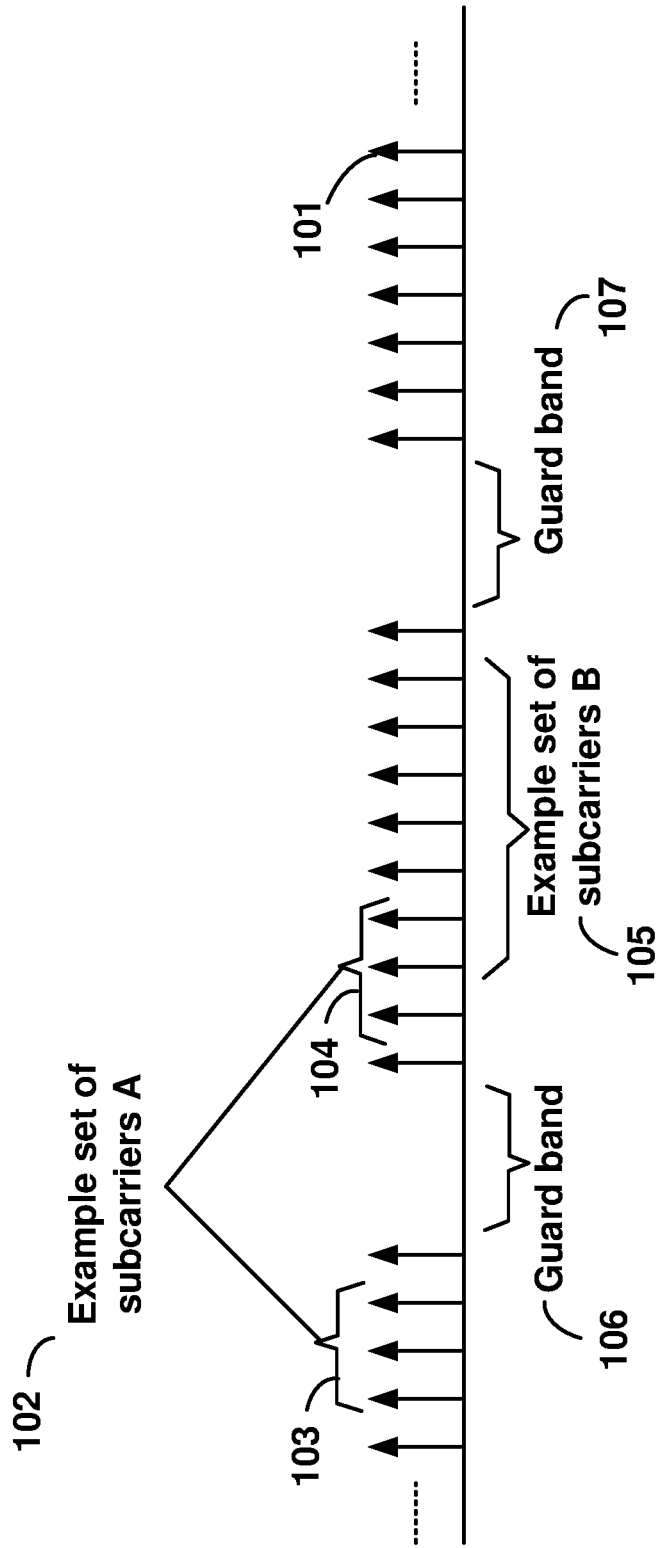
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to packet duplication in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval
TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
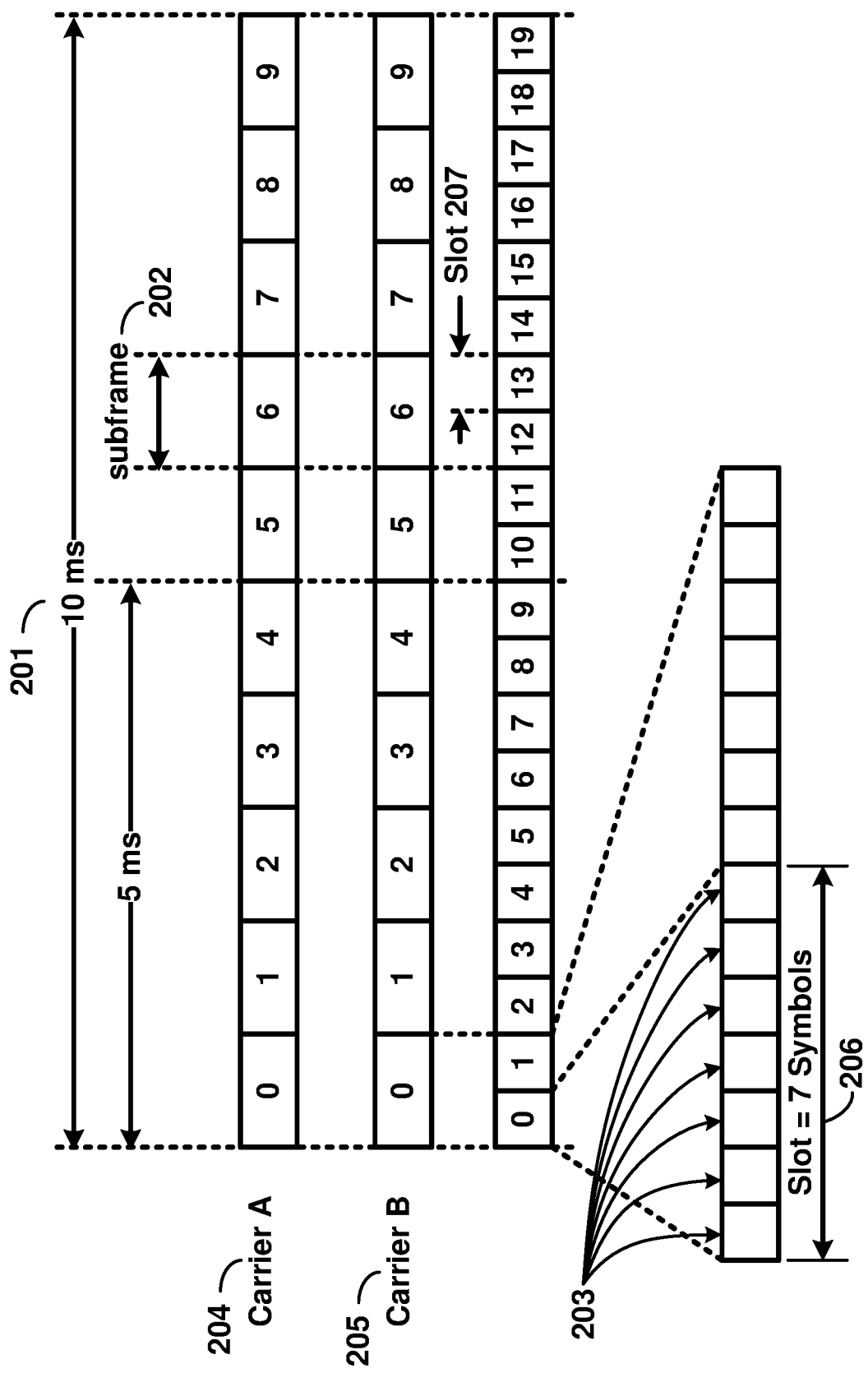
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
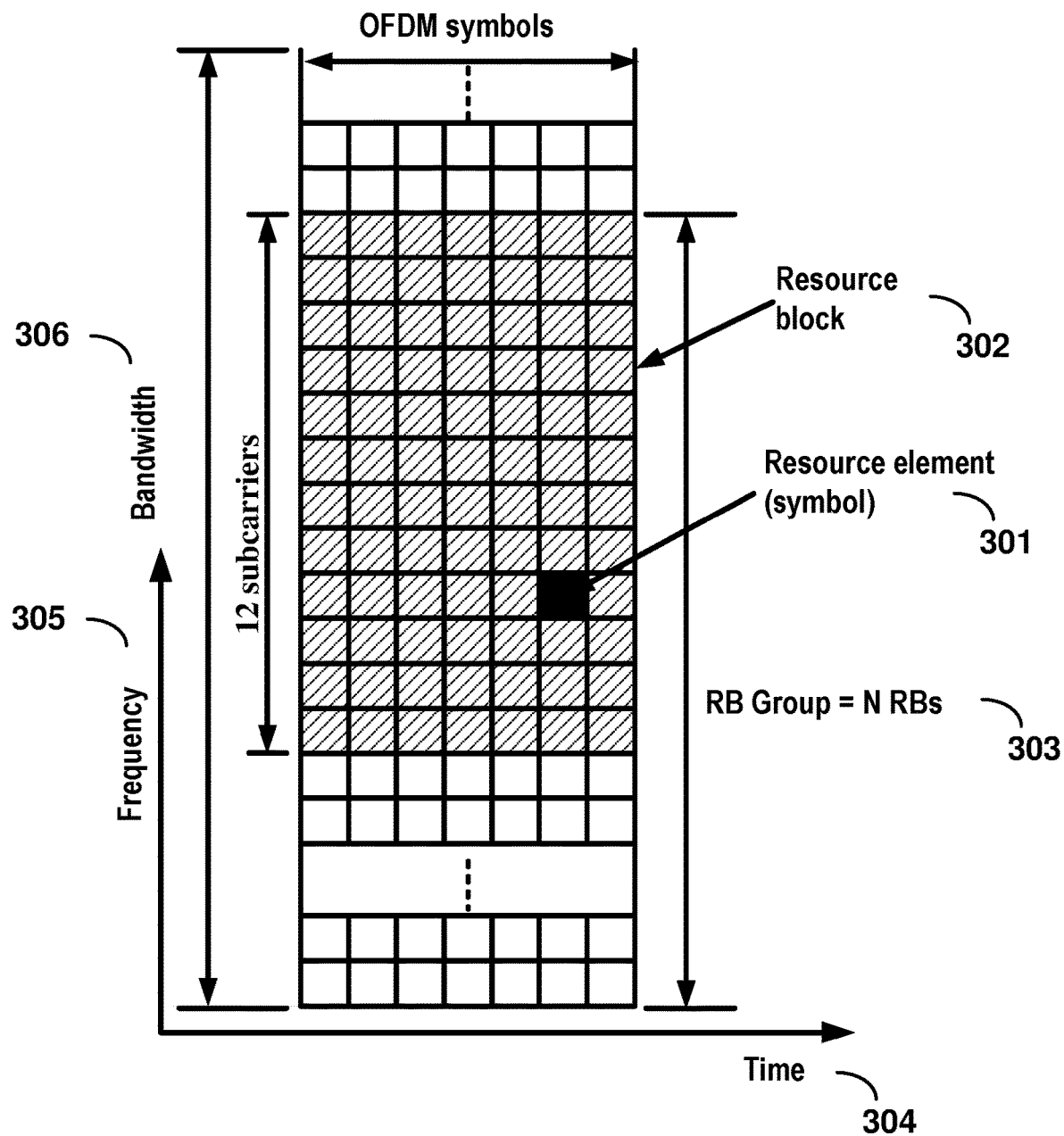
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
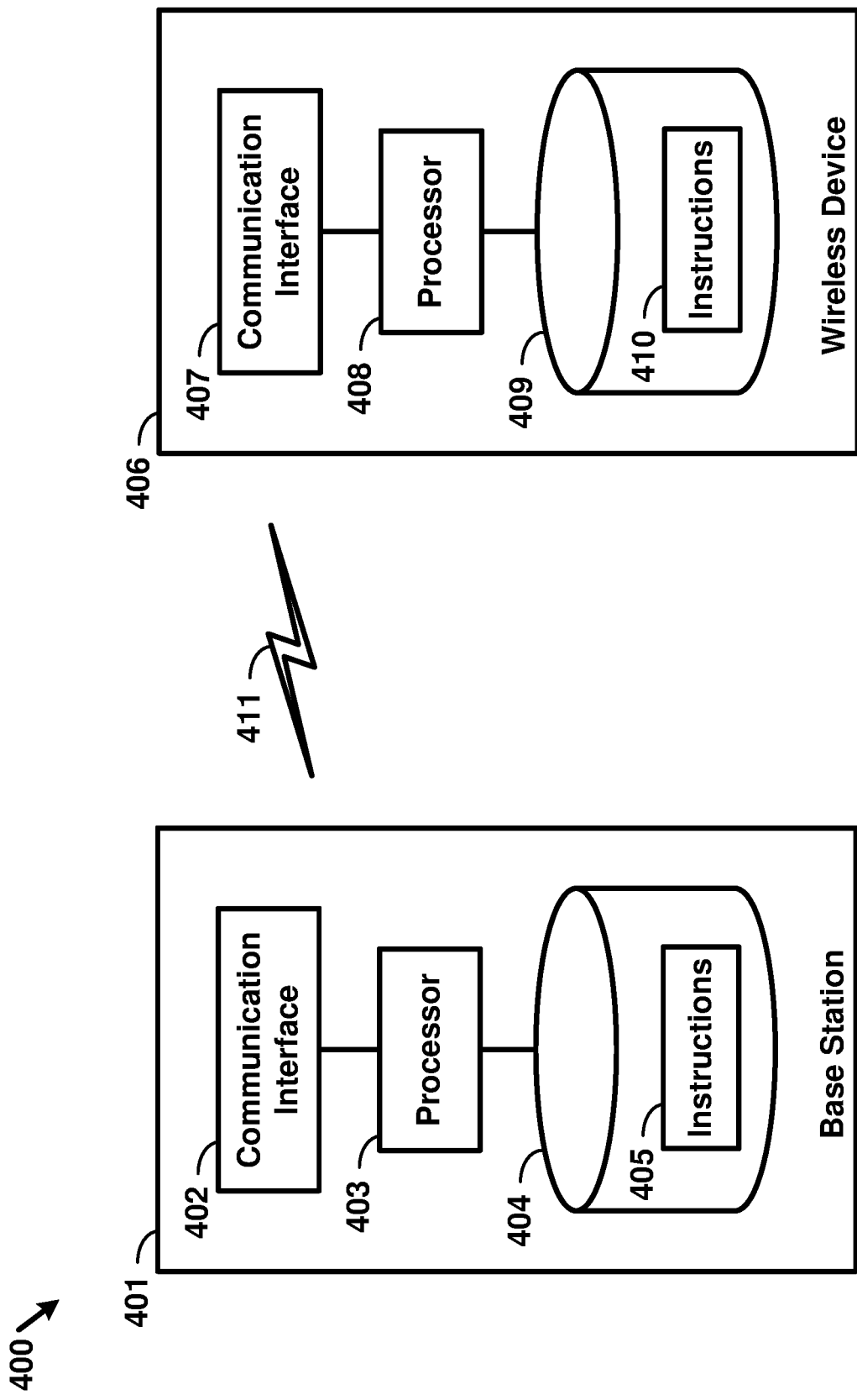
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
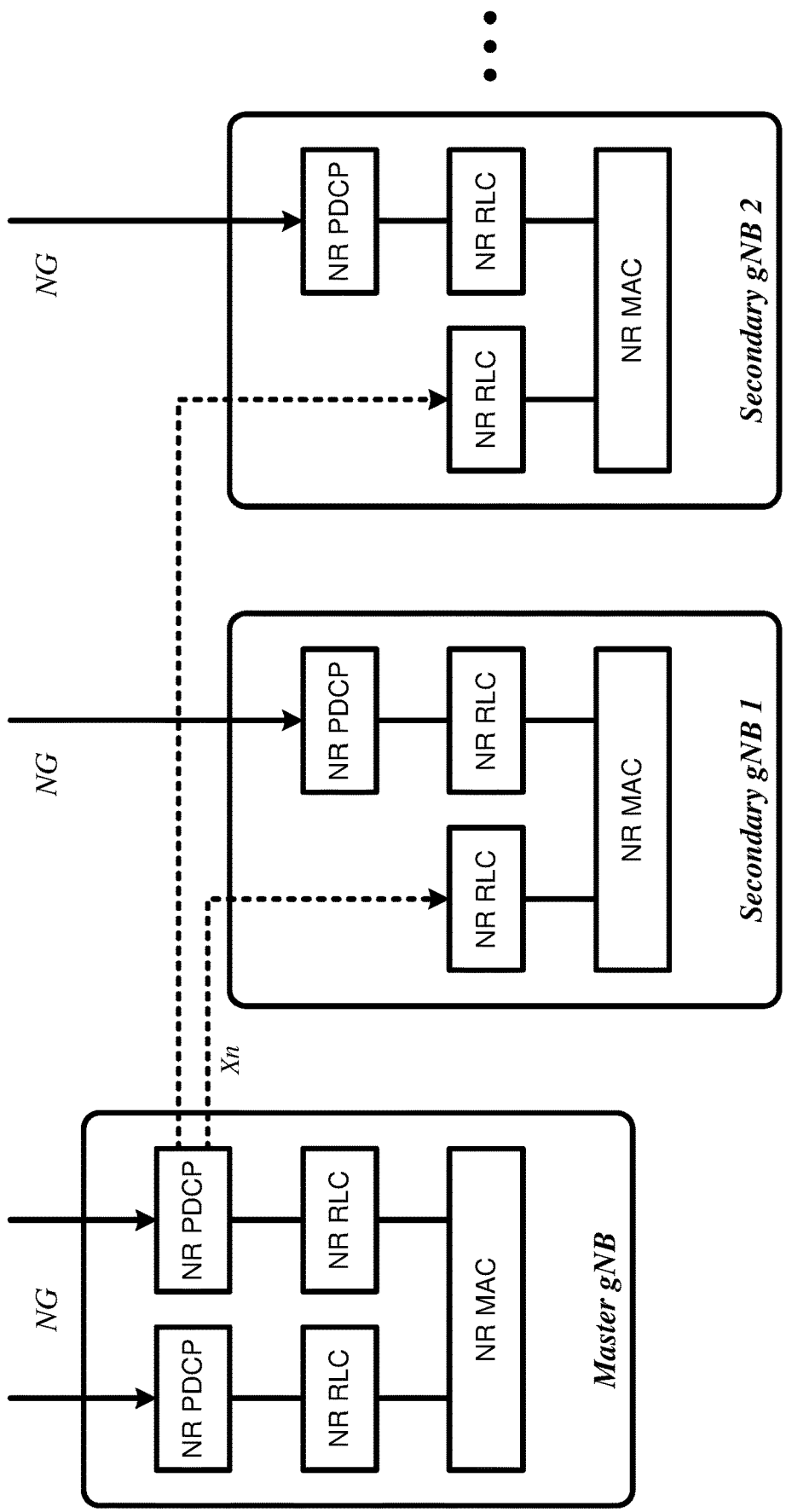
FIG. 6 is an example diagram for a protocol structure with multi-connectivity as per an aspect of an embodiment of the present invention.
Figure 7:
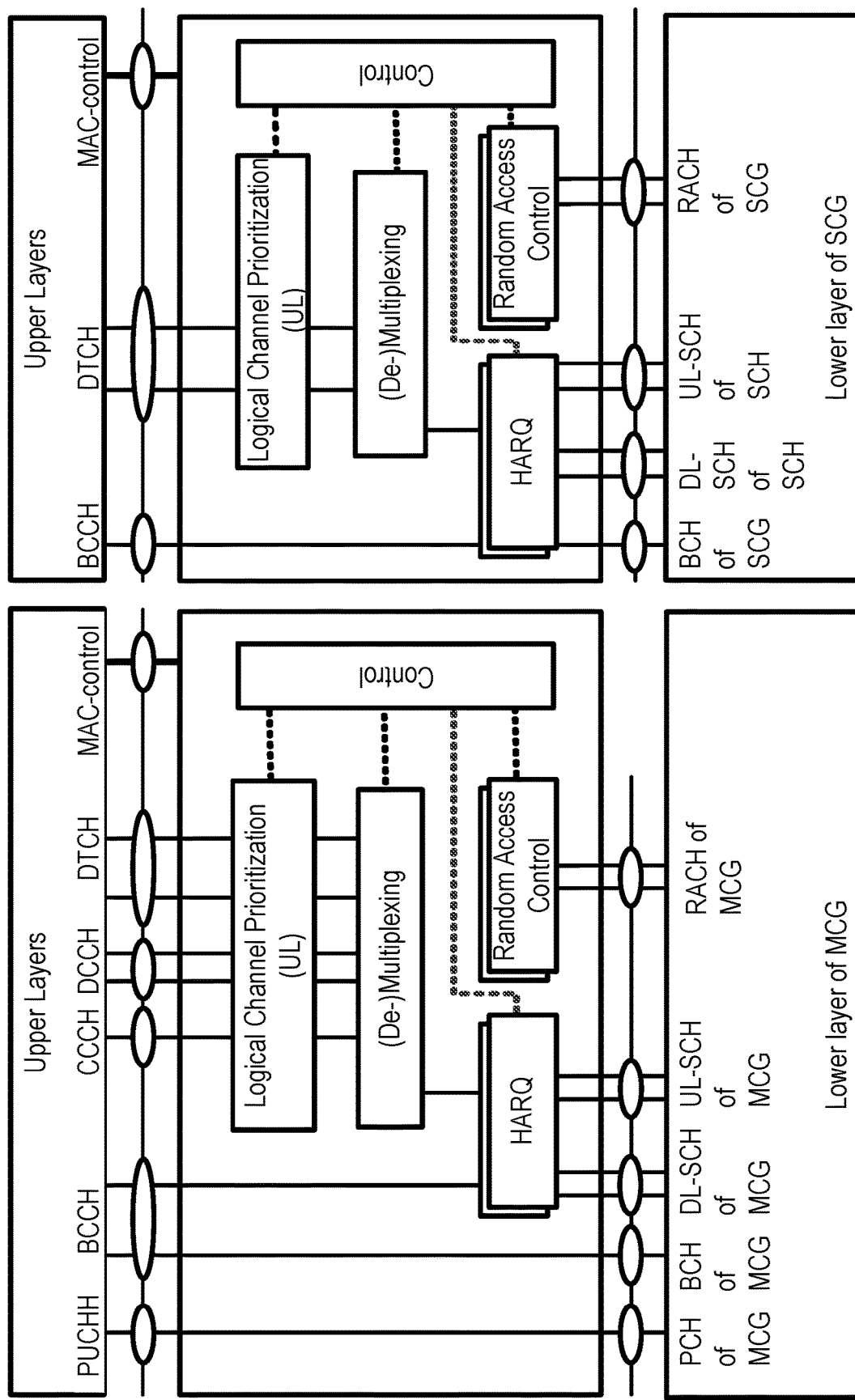
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
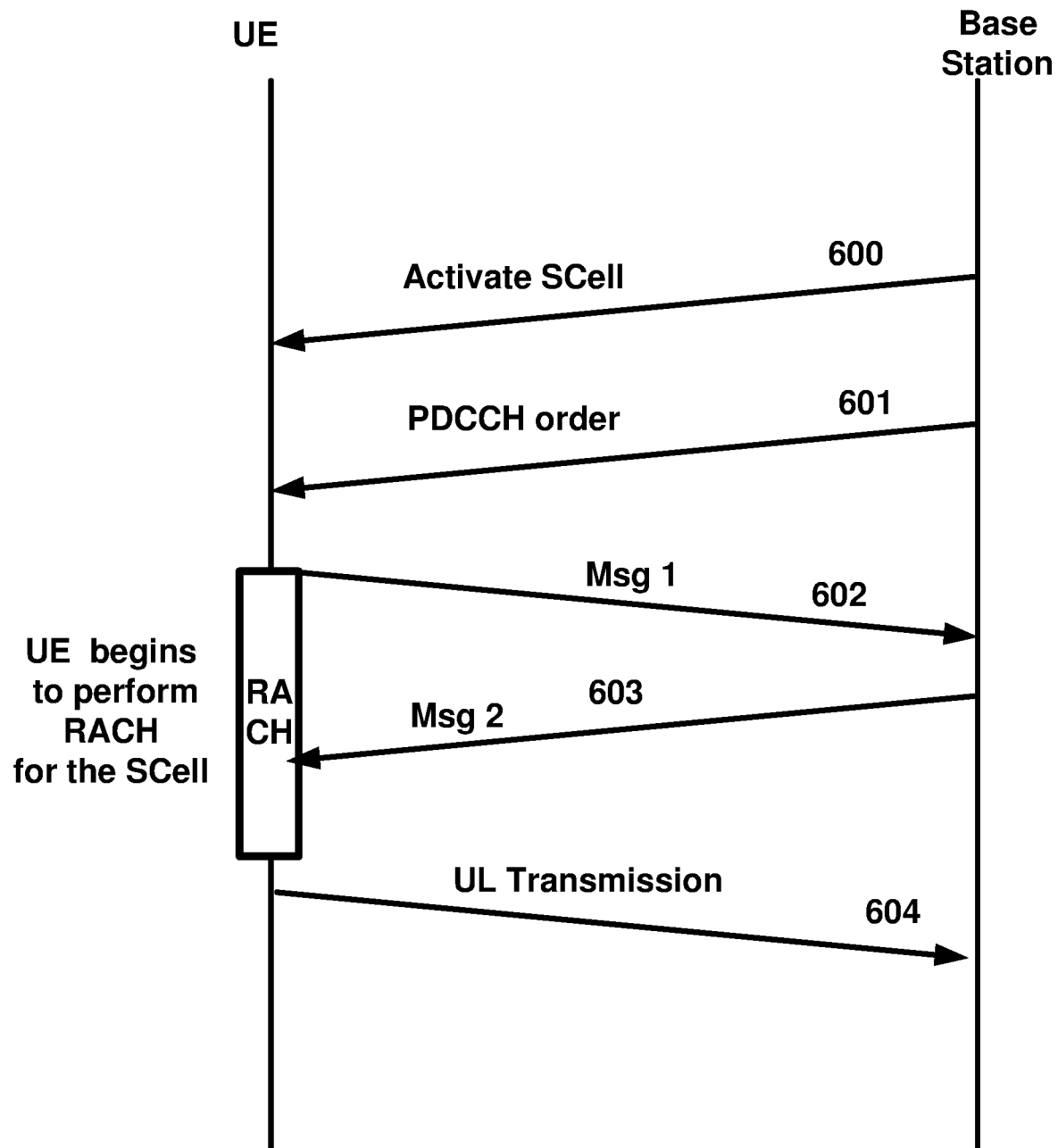
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC_Connection Reconfiguration message includes the sCellToReleaseList, the UE may perform an SCell release. If the received RRC_Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

Figure 11A:
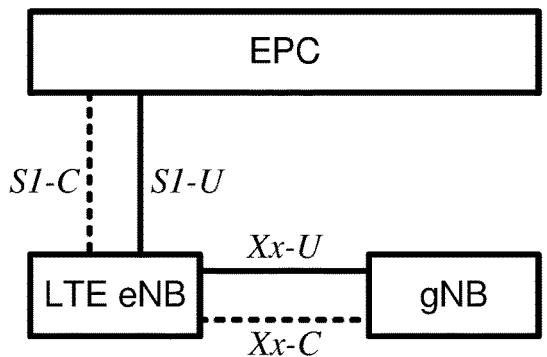
FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.
Figure 11B:
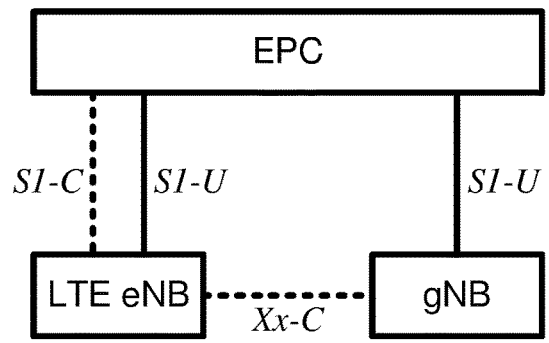

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the example of FIG. 11A, LTE eNB may be connected to EPC with non-standalone gNB and gNB user plane may be connected to EPC via LTE eNB. In the architecture of FIG. 11B, a user plane for a gNB may be connected directly to an S-GW via an S1-U interface between gNB and S-GW. In the example of FIG. 11B, LTE eNB may be connected to EPC with non-standalone gNB and gNB user plane may be connected to EPC directly.

Figure 11C:
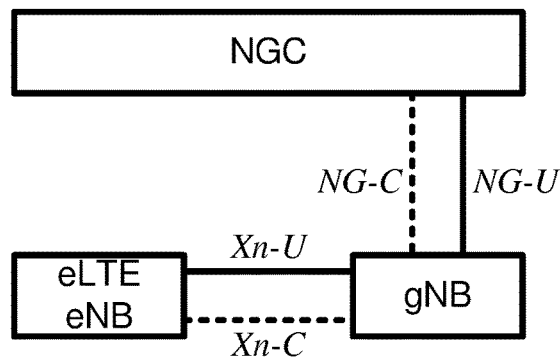
Figure 11D:
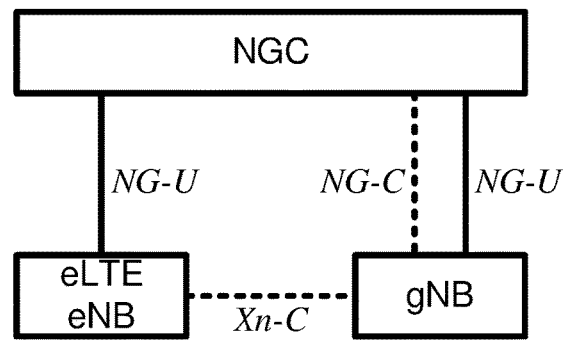

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the example of FIG. 11C, gNB may be connected to NGC with non-standalone eLTE eNB and eLTE eNB user plane connected to NGC via gNB. In the architecture of FIG. 11D, a user plane for an eLTE eNB may be connected directly to a user plane core node via an NG-U interface between eLTE eNB and user plane core node. In the example of FIG. 11D, gNB may be connected to NGC with non-standalone eLTE eNB and eLTE eNB user plane may be connected to NGC directly.

Figure 11E:
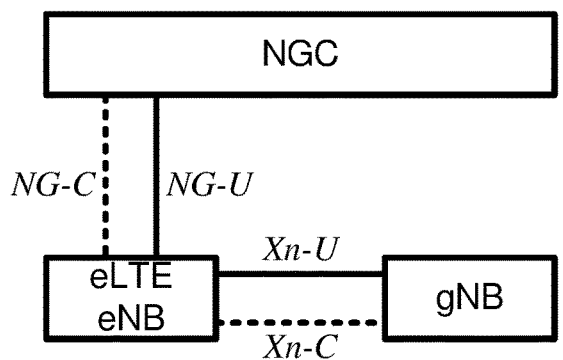
Figure 11F:
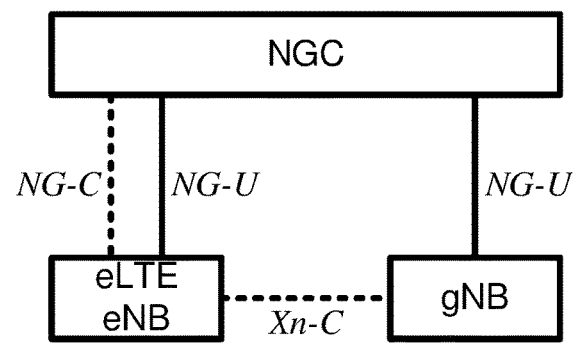

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the example of FIG. 11E, eLTE eNB may be connected to NGC with non-standalone gNB and gNB user plane may be connected to NGC via eLTE eNB. In the architecture of FIG. 11F, a user plane for a gNB may be connected directly to a user plane core node via an NG-U interface between gNB and user plane core node. In the example of FIG. 11F, eLTE eNB may be connected to NGC with non-standalone gNB and gNB user plane may be connected to NGC directly.

Figure 12A:
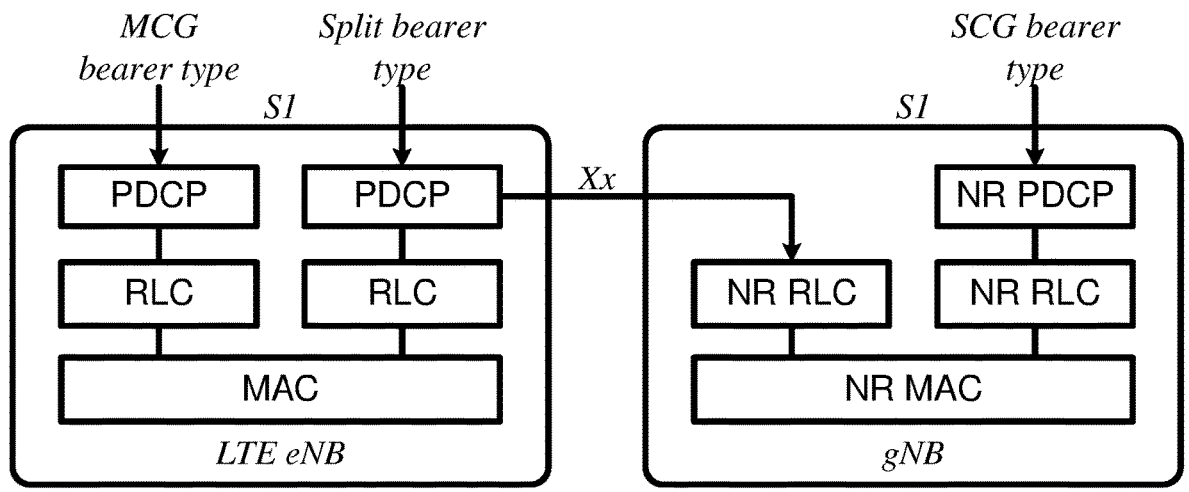
FIG. 12A, FIG. 12B, and FIG. 12C are example diagrams for radio protocol structures of tight interworking bearers as per an aspect of an embodiment of the present invention.
Figure 12B:
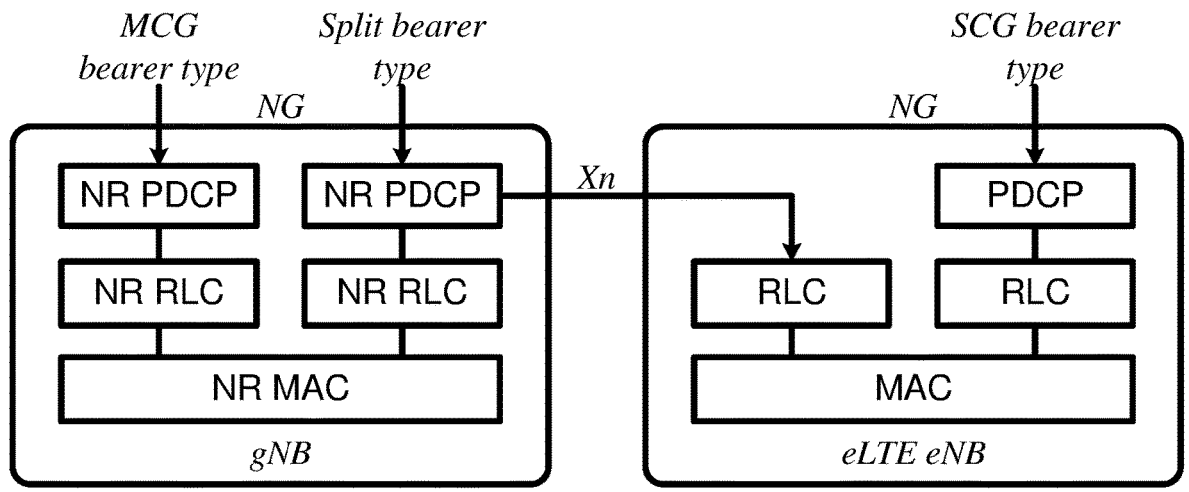
Figure 12C:
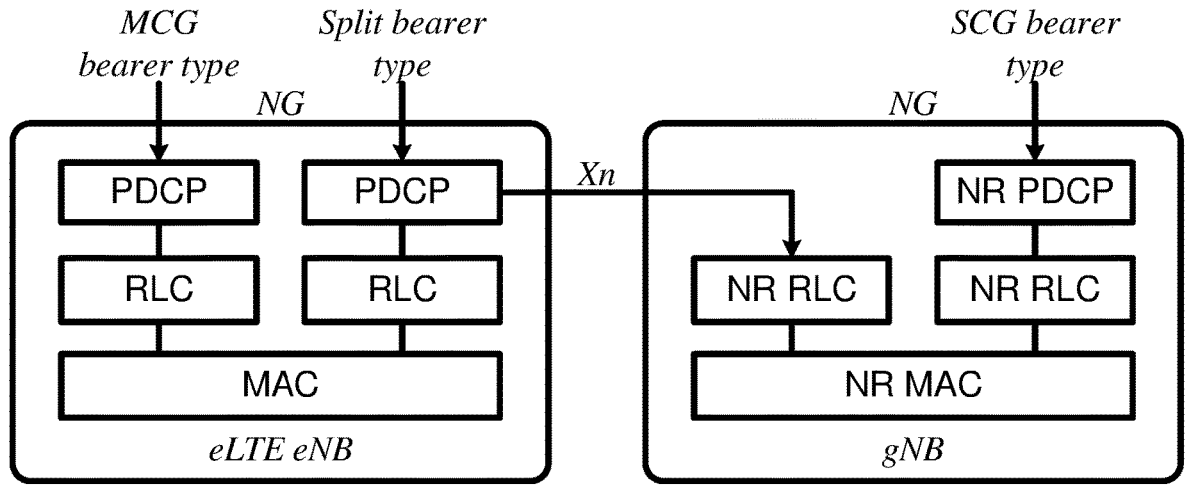

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. FIG. 12A is an example protocol architecture for split bearer and SCG bearer where the LTE eNB is connected to EPC with non-standalone gNB. In FIG. 12B, a gNB may be a master base station, and an eLTE eNB may be a secondary base station. FIG. 12B is an example protocol architecture for split bearer and SCG bearer where the gNB is connected to NGC with non-standalone eLTE eNB. In FIG. 12C, an eLTE eNB may be a master base station, and a gNB may be a secondary base station. FIG. 12C is an example protocol architecture for split bearer and SCG bearer where the eLTE eNB is connected to NGC with non-standalone gNB. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
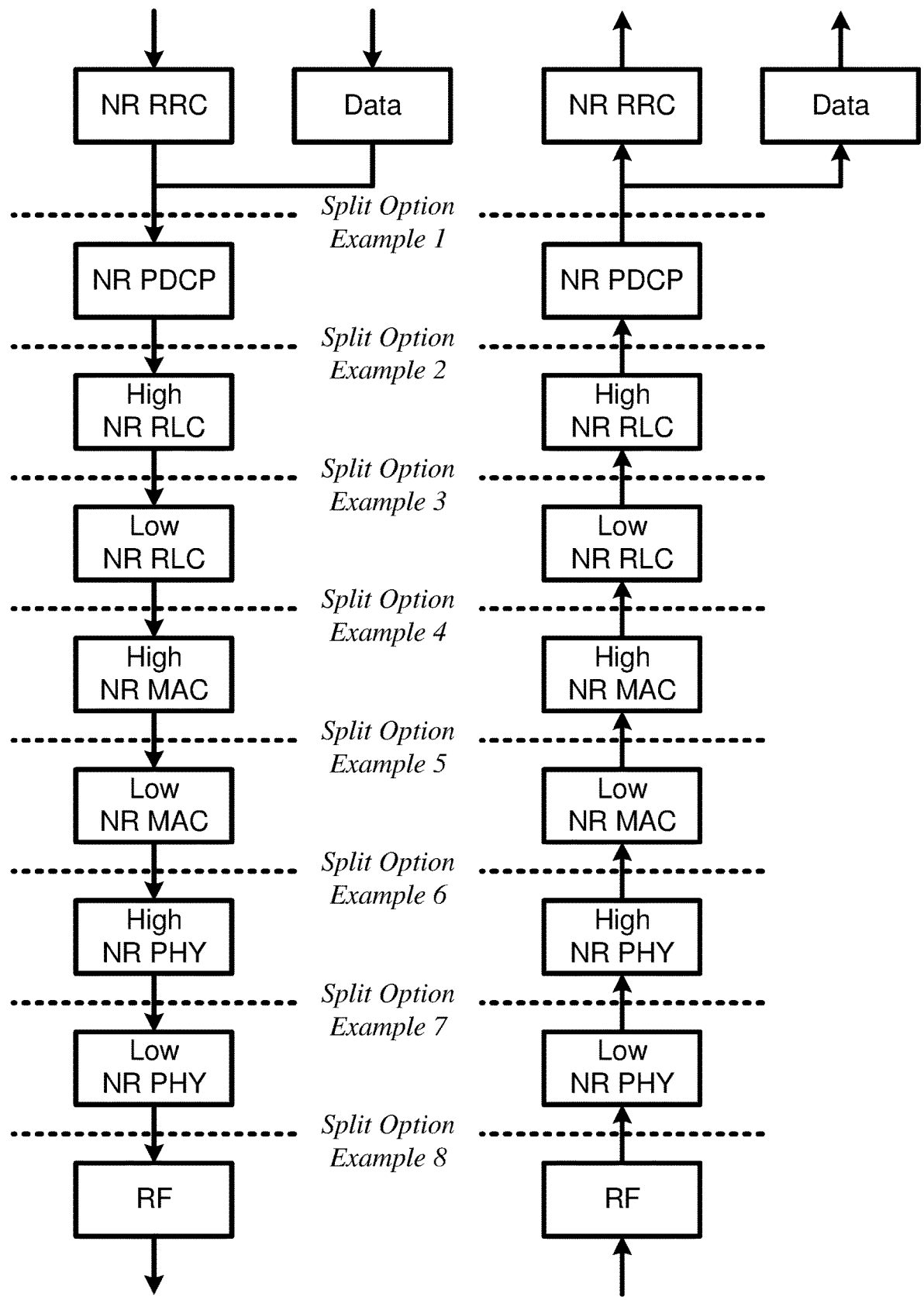
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Transmission reliability and latency enhancement are example aspects of ultra-reliable low-latency communications (URLLC). In an example, multi-connectivity may enhance reliability for URLLC. In an example, multi-connectivity may comprise packet duplication, link selection, etc. In an example, packet duplication may be used for user-plane and/or control-plane traffic. In an example, LTE-NR dual connectivity may use packet duplication. In an example, the packet data convergence protocol (PDCP) function in a transmitter may enable packet duplication and the PDCP function in the receiver may enable duplicate packet removal. In an example, radio link control (RLC) retransmission (e.g., ARQ) may not be used for URLLC, e.g., for meeting the user-plane latency requirements. In an example, redundancy schemes operating below PDCP and/ or in carrier aggregation (CA) scenarios may be used for the reliability/latency enhancement of URLLC.

In an example in NR, multi-connectivity (MC) may comprise dual-connectivity (DC) and/or carrier aggregation (CA). In an example, multi-connectivity may comprise collocated eNBs/gNBs and/or non-collocated eNBs/gNBs. In an example, packet duplication may be based on PDCP with a DC architecture. In an example, packet duplication may be used with centralized and/or non-centralized PDCP. In an example, packet duplication backhaul may be used with different latencies and/or different scheduler implementations (e.g., in LTE-NR integration).

In an example, PDCP duplication may be used in NR. In an example, packet duplication may be in lowers layers, e.g., MAC. In an example, DC may use a plurality of (e.g., two) MAC entities. In an example, the MAC entities and/or the schedulers in MAC entities may be coordinated. In an example, in CA, a common MAC entity, e.g., a scheduler, may control transmissions on a plurality of carriers. In an example, packet duplication may be used with CA. In an example, the MAC layer may have information (e.g., timely information) on radio channel quality measurements (such as channel state information (CSI) report, ACK/NACK feedback, etc.).

In an example, TTI repetitions may be configured e.g., in coverage-limited scenarios. TTI repetitions may increase the reliability. TTI repetitions may increase latency. In an example, the TTI repetitions may be performed on one or more carriers. In an example, with TTI repetitions, the received soft bits of multiple consecutive transmissions within a same HARQ process may be combined. Soft combining gain and/or incremental redundancy gains (e.g., if supported within TTI repetitions) may be achieved.

In an example, duplicate transmission of MAC PDUs (e.g., same transport blocks) may be used. In an example, two or more transport blocks (TBs) of a same size may be created by MAC multiplexing and assembly entity. In an example, two or more TBs may comprise a same duplicated MAC PDU. In an example, HARQ transmissions among carriers may be coupled, e.g., using a same transport block size (TBS). In an example, a receiver may use joint decoding (e.g., soft combining) of the transmissions. In an example, HARQ feedback may be aligned among the carriers. The RLC duplicate discard function may be used to handle the duplicates.

In an example, duplicate transmission of MAC SDUs, e.g., RLC PDUs and/or RLC PDU segments may be used. In an example, MAC multiplexing and assembly entity may transmit MAC SDU duplicates via a plurality of carriers. In an example, the HARQ transmissions among the carriers, e.g. transport block size (and required spectrum), HARQ feedback transmissions, etc. may be independent. In an example, a plurality of carrier bandwidths (e.g., numerologies) and/or carriers with different traffic loads may be considered. In an example, RLC duplicate discard function may be used at the receiver to handle the duplicates.

In an example, NR MAC may support data duplication in carrier aggregation. In an example, the MAC may be configured to duplicate and transmit MAC SDUs among a plurality of carries. In an example, HARQ operation of the transmissions may be independent. In an example, duplicate discard functionality of RLC may be used to discard the duplicates.

In an example, PDCP split bearer and/or PDCP split bearer architecture may be used in CA. In an example, a plurality of RLC entities may be configured corresponding to a PDCP bearer. In an example, PDCP may comprise the duplication function and/or duplicate discard function. In an example, duplicate data may be mapped to two or more logical channels. In an example, MAC multiplexing entity may map data of the RLC entities to different carriers that may be independently transmitted by the HARQ entities associated with the corresponding carriers. In an example, logical channel carrier restrictions may be applied. In an example, one or more flags may be configured for a logical channel to allow/forbid scheduling on one or more carriers. In an example, PDCP split bearer with duplication function may be used in CA architecture. In an example, duplication for CA may build on the PDCP split bearer for duplication to two or more logical channels associated with a MAC entity. In an example, for duplication with CA, transmission restrictions may be configured for one or more carriers per logical channel.

In an example, NR MAC may support data duplication in carrier aggregation by transmitting data from different logical channels using different cells/carriers (e.g. by defining carrier restrictions for a logical channel). Data duplication and duplicate discard may be done in PDCP layer. The PDCP split bearer may be configured with a plurality of logical channels associated to a same cell group/MAC. In an example, data duplicated on PDCP and provided to the different logical channels may be transmitted by MAC via a plurality of carriers.

In an example, using MAC duplication, a same two or more transport blocks (TB) may be transmitted across a plurality of legs, e.g., using one or more MCS and/or redundancy versions. In an example, separate HARQ functions may operate in each leg, e.g., in CA with a HARQ entity comprising a plurality of HARQ processes for a carrier. In an example, a TB may be encoded/decoded and/or go through HARQ process independently. A duplication detection/removal mechanism may be used in MAC layer. In an example, upper layers may handle the duplication detection.

In an example, packet duplication in MAC may be above the HARQ function (e.g., a function per leg) or at the HARQ function level (e.g., single function for sending and combining redundancy versions). In an example, packet duplication in MAC above the HARQ function (e.g., one function per leg) may use a duplication detection/removal function in MAC, or in higher layers.

In an example, packet duplication may be used for user-plane and/or control-plane in NR PDCP. In an example, redundancy schemes operating below PDCP may be used. In an example, a duplication scheme operating at the MAC sublayer may enable a plurality of transmissions of a transport block over a plurality of resource sets to provide diversity gain e.g., against fading, interference and/or link blockage (e.g., shadowing). The different resource sets may be separated in time, frequency and/or space domains. In an example, at the receiver, the transmissions may be soft-combined and/or processed separately.

In an example, PDCP packet duplication may be configured by radio resource configuration (RRC) signaling, e.g., per bearer and/or split radio bearer. In an example, PDCP packet duplication may be configured per UE using higher layer signaling (e.g., RRC). In an example, packet duplication may be enabled/disabled considering e.g., UE mobility, cell resource availability, backhaul loads and latency, etc. In an example, PDCP packet duplication may be activated or deactivated dynamically through downlink control signaling (e.g., physical layer and/or MAC layer signaling). In an example, a UE may initiate duplication e.g., based on triggering one or more criteria (e.g. measurements of L1, L2 signals, or radio resource management (RRM) and/or radio link monitoring (RLM) events, etc.). In an example, a UE may autonomously activate or deactivate PDCP packet duplication based on one or more configured criteria. The one or more criteria may be configured e.g., with RRC. In an example, a UE may receive a configuration of a prohibit timer (e.g., PDCP duplication prohibit timer). In an example, a UE may start the timer when it receives control signaling from gNB/network indicating that PDCP duplication may be deactivated. The UE may autonomously activate duplication when the timer is expired. The timer may be set to infinity to disable UE autonomous activation of PDCP duplication.

In an example, with URLLC packet duplication at PDCP, a UE may report data in its PDCP buffer to a MAC entity in multi-connectivity. In an example, duplicated data may be considered as new data available for transmission. In an example, the duplicated data may be reported and transmitted, e.g., in the same manner as other data. In an example, for MAC buffer status reporting, the UE MAC may include amount of data resulting from the PDCP duplication function as data available for transmission. In an example, data duplicates may use separate uplink grants. In an example, a grant may be unique per cell group. In an example, assignment between a PDCP duplicate PDU and a MAC entity may be done when the duplicate PDUs are generated in PDCP. In an example, a UE may trigger BSR/SR to an applicable MAC entity. In an example, for resource allocation based on dynamic scheduling, a UE may assign a duplicate PDCP PDU to different MAC entities and triggers BSR/SR for an applicable MAC entity when PDCP duplication is active.

In an example, PDCP at a transmitter may support duplicated packet transmission over a plurality of links. In an example, PDCP at a receiver may perform duplication detection/removal. In an example, for a CA scenario, where transmission points on different carrier frequencies may be connected by ideal backhaul, PDCP duplication may be applied, e.g., based on Dual-Connectivity/Multi-Connectivity framework. In an example, PDCP duplication based on Dual-Connectivity/Multi-Connectivity framework may be applied to scenarios where transmission points on different carrier frequencies are connected by ideal backhaul. In an example redundancy operation below PDCP, duplication may be at RLC layer. In an example, RLC entity at a transmitter may make duplicate transmissions of a PDU. In an example, RLC entity at a receiver side may remove received duplications. In an example, redundancy operation at MAC layer may be MAC SDU duplication and/or autonomous HARQ redundant transmission.

In an example, a RLC PDU may correspond to a PDCP PDU. In an example, a duplicated RLC PDU may consist of a duplicated PDCP PDU. In an example, duplicate transmission of RLC PDUs may be equivalent to duplicate transmission of PDCP PDUs. In an example carrier aggregation (CA) scenario (e.g., ideal backhaul), PDCP entity and RLC entity may share a same topology of transmission points and backhaul structure. In an example, MAC SDU duplication may use one HARQ entity per component carrier/cell. In an example, a MAC TB may be transmitted by a HARQ process of a HARQ entity at a carrier. The duplicated MAC SDUs may be in the respective TBs generated for different carriers. The duplication may be at MAC SDU level, which may correspond to a RLC PDU and in turn to a PDCP PDU. In an example, a MAC SDU may not have a sequence number in NR.

In an example, different redundancy versions of a MAC TB may be transmitted over a plurality of aggregated carriers. In an example, a HARQ process may transmit different RVs of a MAC TB over a plurality of component carriers. At the receiver, soft combining may be used. In an example, a MAC TB may consist of a plurality of MAC SDUs/RLC PDUs/PDCP PDUs. In an example, packet duplication may be applied to data radio bearers (DRBs)/logical channels carrying URLLC like services.

In an example, a gNB may configure/enable/disable data redundancy below PDCP layer, considering radio conditions and functionalities provisioned in other layers. In an example, a logical channel may be mapped to one or more numerologies/TTI durations. In an example, if a logical channel may be mapped to one or more numerologies/TTI durations, duplicate data of the logical channel may be transmitted over the one or more numerologies (e.g., in a single carrier and/or multiple carriers).

In an example, support for packet duplication function may be configured per radio bearer. In an example, a UE may enable/disable packet duplication function. In an example, the gNB may indicate the UE to turn on/off the duplication function (e.g., using RRC and/or physical layer and/or MAC layer signaling). In an example, for a radio bearer with packet duplicate function, enabling/disabling packet duplication function may be dynamically controlled.

In an example, for UL packet duplication using Dual connectivity in NR-NR interworking scenario, the UL PDCP entity of the radio bearer may coordinate the transmission of the UL PDCP PDU towards the secondary cell group (SCG) and master cell group (MCG) by indicating the data availability of the same UL PDCP SDU in the buffer status reports (BSRs) to both MCG and SCG. In an example, the wireless device may transmit PDUs of a same PDCP SDU in the logical channels of the MCG and SCG. In an example, the UL PDCP entity may maintain the data availability for the MCG and the SCG separately (e.g. by maintaining separate PDCP SDU buffers for MCG and SCG, or by maintaining separate available or unavailable indications corresponding to SDUs in the same buffer). In an example, whether to allow for duplication and the number of duplications may be configurable via RRC signaling per radio bearer.

In an example, the BSR procedure and SR triggering may be similar as in normal operation without packet duplication. The BSR and SR may be separately triggered by the MAC entities for MCG and SCG on the UE side. In an example, the logical channel(s) corresponding to URLLC may be configured to have highest priority and/or higher priority than other traffic channels. In an example, the logical channel prioritization (LCP) may prioritize the URLLC logical channel(s) when generating and sending the MAC PDU to the lower layers for the UL grant (e.g., configured or dynamic) corresponding to the numerology configured for the URLLC logical channel. In an example, for the DL packet duplication at the PDCP level, the DL RX PDCP entity may discard the duplicated PDCP PDUs e.g., if duplicate reception is detected.

In an example, RRM measurement for mobility in the connected mode may provide information for the gNB/network to manage addition and removal of a cell in multi-connectivity configuration. In an example, semi-static (e.g., using RRC) and dynamic signaling may control which legs of a split bearer, data may be duplicated. In an example, RRM measurements may be considered as baseline input for the data duplication control, e.g., a set of RSRP threshold.

In an example, for DL and UL, duplication for CA may use PDCP duplication to more than one logical channel. In an example, the duplicated PDCP PDUs may be sent over a plurality of (e.g., different) carriers. In an example, the logical channels with data and the logical channels with duplicate data may be handled by one MAC entity. In an example, the logical channels with data and the logical channels with duplicate data may be handled by two or more MAC entities.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one one or messaes may comprise a logical channel identifier for each of the pluraility of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an examle, data from a packet data convergence protocol (PDCP) entity corresponding to a bearer may be dupplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more beares may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, 0≤n≤N (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologie and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, a wireless device may be configured with packet data convergence protocol (PDCP) packet duplication for one or more radio bearers (e.g., data radio bearers (DRBs) and/or signaling radio bearers (SRBs)). The wireless device may perform the PDCP packet duplication to enhance reliability for example for URLLC services. In an example, RRC may configure packet data convergence protocol (PDCP) for duplication. The wireless device may receive one or more messages configuring PDCP packet duplication for the PDCP layer. In an example, the radio protocols of a wireless device may use separate radio link control (RLC) entities and/or separate logical channels to handle duplicates. In an example, the duplicates may be referred to as legs. In an example, there may be one additional leg configured for PDCP duplication (e.g., one leg for data and one leg for duplicate data). In an example, the original PDCP PDU and the corresponding duplicate may not be transmitted on the same transport block. In an example in carrier aggregation, a PDCP PDU and its duplicate may be transmitted on different carriers and/or may not be transmitted on a same carrier. There may be one MAC entity handling PDCP duplication for carrier aggregation. In an example, there may be logical channel mapping restrictions to handle duplicates within a MAC entity. The logical channel prioritization procedure of the MAC entity may take into account the logical channel mapping restrictions when multiplexing logical channels for a TB to be transmitted on a cell. In an example, PDCP layer may perform a PDCP duplicate discard function to discard the PDCP duplicates. In an example, PDCP duplicate discarding may be performed at least when duplication is enabled for SRBs/DRBs. In an example, UL PDCP duplication may be configurable per DRB. In an example, UL PDCP duplication may be configurable per SRB in case of NR-NR dual connectivity (DC). In an example, the initial state of the UL PDCP duplication (e.g., duplication active or not active and/or if not active which leg is used) may be a default state. In an example, the initial state of the UL PDCP duplication (e.g., duplication active or not active and/or if not active which leg is used) may be signalled by RRC. In an example, MAC CE may be used for control of UL duplication. The PDCP packet duplication MAC CE may indicate whether a radio bearer in one or more radio bearers are activated for PDCP packet duplication or not. In an example, duplication on a single carrier may not be supported. RRC may configure mapping of two duplicate logical channel (LCHs) to different carriers. In an example, one carrier may not have both of the duplicate LCHs mapped to it. In an example, the duplicated PDCP PDUs may be submitted to two different RLC entities. In an example, multiple semi-persistent scheduling (SPSs) may be supported for duplication. One SPS may be used to transmit original PDCP PDUs and one SPS may be used to transmit duplicate PDCP PDUs. In an example, MAC CE may enable per radio bearer control of activation/deactivation of packet duplication. The packet duplication for a radio bearer may be configured by RRC. In an example in carrier aggregation (CA), after the duplication is deactivated, the logical channel to carrier mapping restriction may not be applied. In an example, a UE may send new data via one specified logical channel. In an example, the RLC transmissions of the second leg may be continued in response to deactivation of PDCP duplication for a radio bearer. In an example, CA packet duplication may not be applied to LTE CA of EN-DC. In an example, a PDCP duplication activation/deactivation MAC CE may contain a bitmap corresponding to DRBs configured with duplication. In an example, which logical channel may be used for duplication leg may be based on RRC configuration for CA and DC. In an example, in response to a sCellDeactivationTimer associated with an activated SCell expiring, the wireless device may deactivate the SCell according to a timing. In an example, in response to a sCellDeactivationTimer associated with an activated SCell expiring, the wireless device may flush HARQ buffers associated with the SCell. In an example, in response to a sCellDeactivationTimer associated with an activated SCell expiring, the wireless device may not transmit UL-SCH on the SCell and/or may not monitor control channel (e.g., PDCCH) on the SCell and/or for the SCell.

In an example, a wireless device may receive an information element (e.g., sCellDeactivationTimer using RRC signaling. In an example, the value of the IE may be in number of radio frames. Other time reference may be used for the value of the IE. In an example, the IE may be configured if the wireless device is configured one or more SCells other than PSCell and PUCCH SCell. In an example, if the field is absent, the UE may delete existing values for the field and may set the value to infinity. In an example, the same value may apply for different cells of cell group. In an example, different values may apply to different cells of a cell group.

In an example, a MAC entity may be configured with one or more SCells. The network may activate and/or deactivate the configured SCell(s). In an example, a SpCell may always be activated. The network may activate and deactivate the SCell(s) by sending Activation/Deactivation MAC control element (MAC CE). Furthermore, the MAC entity may maintain a sCellDeactivationTimer timer per configured SCell. In an example, the MAC entity may maintain a sCellDeactivationTimer timer per configured SCell except the SCell configured with PUCCH, if any. In an example, the MAC entity may deactivate an SCell upon the expiry of its associated sCellDeactivationTimer. In an example, the same initial timer value may apply to each instance of the sCellDeactivationTimer. In an example, different initial timer values may apply to different instances of sCellDeactivationTimer. In an example, sCellDeactivationTimer may be configured by RRC. The configured SCells may be initially deactivated upon addition and after a handover. The configured SCG SCells may be initially deactivated after a SCG change.

In an example, the MAC entity may, for a TTI and for a configured SCell and if the MAC entity receives an Activation/Deactivation MAC control element in the TTI activating the SCell, the MAC entity may, in a TTI according to a timing, activate the SCell, e.g., apply normal SCell operation including SRS transmissions on the SCell, CQI/PMI/RI/PTI/CRI reporting for the SCell, PDCCH monitoring on the SCell, PDCCH monitoring for the SCell, PUCCH transmissions on the SCell, if configured. The MAC entity may start or restart the sCellDeactivationTimer associated with the SCell. The MAC entity may trigger PHR.

In an example, the MAC entity may, for a TTI and for a configured SCell and if the MAC entity receives an Activation/Deactivation MAC control element in the TTI deactivating the SCell or if the sCellDeactivationTimer associated with the activated SCell expires in the TTI, in a TTI according to a timing, deactivate the SCell, stop the sCellDeactivationTimer associated with the SCell and flush HARQ buffers associated with the SCell. In an example, if PDCCH on the activated SCell indicates an uplink grant or downlink assignment; or if PDCCH on the Serving Cell scheduling the activated SCell indicates an uplink grant or a downlink assignment for the activated SCell, the MAC entity may restart the sCellDeactivationTimer associated with the SCell.

In an example if the SCell is deactivated, the wireless device may not transmit SRS on the SCell, the wireless device may not report CQI/PMI/RI/PTI/CRI for the SCell, the wireless device may not transmit on UL-SCH on the SCell, the wireless device may not transmit on RACH on the SCell, the wireless device may not monitor the PDCCH on the SCell, the wireless device may not monitor the PDCCH for the SCell, and the wireless device may not transmit PUCCH on the SCell.

In an example, HARQ feedback for the MAC PDU containing Activation/Deactivation MAC control element may not be impacted by PCell, PSCell and PUCCH SCell interruptions due to SCell activation/deactivation. In an example, in response to a SCell being deactivated, the ongoing Random Access procedure on the SCell, if any, may be aborted.

In an example, activation/deactivation of cells may be supported for NR carrier aggregation. In an example, the activation/deactivation may be controlled per component carrier by explicit indication (e.g., using a cell activation/deactivation MAC CE) and implicit mechanisms (e.g., configuration of cell deactivation timer). In an example, the configuration of the implicit deactivation mechanism (e.g., configuration of cell deactivation timer) may be per component carrier.

In an example embodiment, a wireless device may receive one or more messages comprising one or more RRC messages. The one or more RRC messages may comprise configuration parameters for one or more cells. In an example, the one or more cells may comprise a primary cell and one or more secondary cells. The one or more RRC messages may comprise configuration parameters for one or more radio bearers. A radio bearer in the one or more radio bearers may be a data radio bearers (DRB) or a signaling radio bearer (SRB). The one or more RRC messages may comprise configuration parameters for one or more logical channels. A logical channel in the one or more logical channels may be associated with one or more buffers. The one or more messages may comprise configuration parameters for packet data convergence protocol (PDCP) packet duplication. In an example, the PDCP packet duplication configuration parameters may indicate that one or more radio bearers (e.g., one or more DRBs and/or one or more SRBs) are configured with PDCP packet duplication. In an example, a first radio bearer in the one or more radio bearers may be configured with and/or activated for PDCP packet duplication. In an example, a radio bearer may be configured and activated for PDCP packet duplication with RRC configuration. A radio bearer configured for PDCP packet duplication may be also activated for PDCP duplication, e.g., the wireless device may start the PDCP packet duplication for the radio bearer upon receiving an RRC configuration message configuring PDCP packet duplication for the radio bearer. In an example, the radio bearer may be configured for PDCP packet duplication with RRC and may be activated/deactivated for PDCP packet duplication with MAC CE. The first radio bearer may be mapped by the PDCP layer to a plurality of (e.g., two) radio link control (RLC) entities (e.g., a first RLC entity and a second RLC entity). In an example, the wireless device may enable the second RLC entity upon activation of PDCP packet duplication for the first radio bearer. In an example, the wireless device may disable the second RLC entity upon deactivation of PDCP packet duplication for the first radio bearer. In an example, the first RLC entity and the second RLC entity, corresponding to the first radio bearer, may correspond to a first logical channel and a second logical channel (e.g., duplicate for the first logical channel), respectively. In an example, the PDCP packet duplication configuration parameters may indicate mapping between the first logical channel and the second logical channel corresponding to the first radio bearer and different cells. In an example, the PDCP packet duplication configuration parameters and/or other configuration parameters may indicate that the first logical channel may be mapped to one or more first cells and the second logical channel (e.g., the duplicate logical channel) may be mapped to one or more second cells. The one or more first cells and the one or more second cells may be different. In an example, the PDCP packet duplication configuration parameters and/or other configuration parameters may indicate that the first logical channel may mapped to a first cell which can be any cell in the one or more cells and the second logical channel may be mapped to a cell in the at least one second cell that is different from the first cell. In an example, the PDCP packet duplication configuration parameters and/or other configuration parameters may indicate the first logical channel and the second logical channel may be mapped to different cells without specifying the cells and/or locking the first logical channel or the second logical channel to a cell.

In an example, a cell in the one or more first cells to which the first logical channel is mapped to may be associated with a priority and/or index. In an example, a cell in the one or more second cells to which the second logical channel is mapped to may be associated with a priority and/or index. In an example, the one or more RRC messages may indicate the priority and/or the index. In an example, the PDCP duplication configuration parameters may indicate the priority and/or the index. In an example, the priority and/or the index may be or may be based the cell index. The cell index associated with a cell may be configured with RRC.

Figure 15:
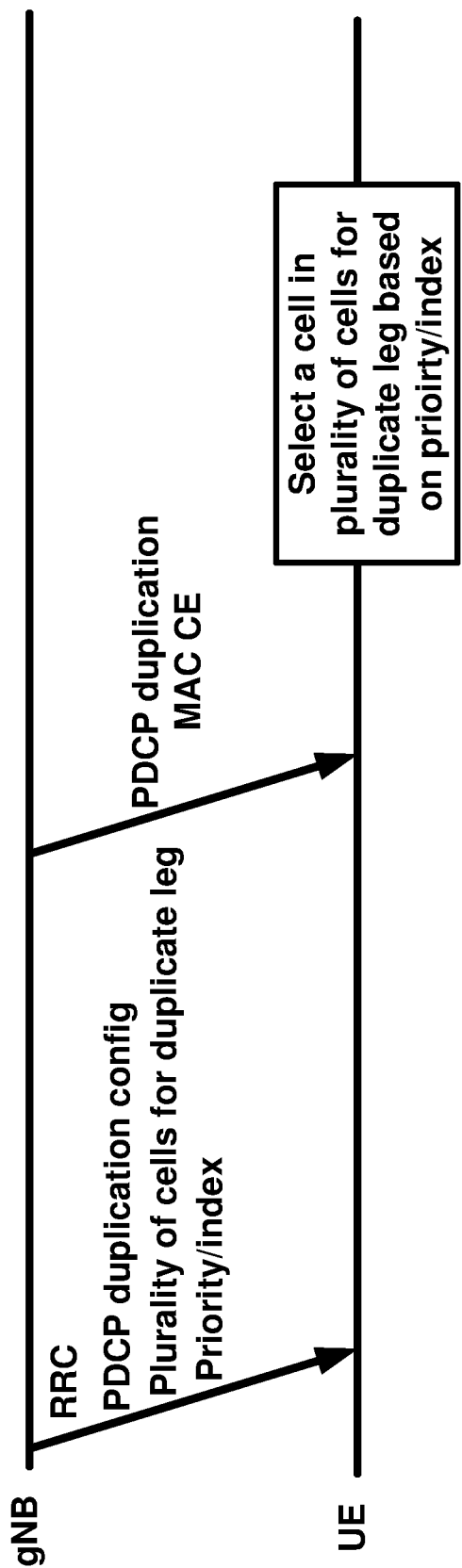
FIG. 15 is an example packet duplication procedure as per an aspect of an embodiment of the present invention.

In an example embodiment, the wireless device may receive a PDCP duplication MAC control element (MAC CE). The PDCP duplication MAC CE may activate the PDCP packet duplication for one or more radio bearers comprising the first radio bearer. The one or more radio bearers may be configured for PDCP packet duplication with RRC. The PDCP duplication MAC CE may comprise a bitmap corresponding to radio bearers configured with duplication. The bitmap may indicate which radio bearer(s) among the radio bearers configured with PDCP duplication are activated for duplication and/or which radio bearer(s) among the radio bearers configured with PDCP duplication are deactivated for duplication. In an example, RRC may indicate which logical channels may be used for the duplicate leg (e.g., the one or more second cells corresponding to the second logical channel). In an example, the wireless device may select a cell in the one or more second cells that the second logical channel is mapped to transmit data from the second logical channel. An example procedure is shown in FIG. 15. In an exam embodiment, the wireless device may select the cell in the one or more second cells that is activated and based on the priority of the cell and/or index value associated with the cell in the one or more second cells. In an example, the wireless device may select the cell in the one or more second cells that is activated and that has higher priority compared to the other activated cells in the one or more second cells. In an example, the wireless device may select the cell in the one or more second cells that is activated and that has a larger index compared to the other activated cells in the one or more second cells. In an example, the wireless device may select the cell in the one or more second cells that is activated and that has a smaller index compared to the other activated cells in the one or more second cells. The index may be or may be based on the cell index and/or may be based on a PDCP packet duplication specific index associated with the cell. In an example embodiment, in response to none of the one or more second cells being activated when the wireless device receives a PDCP duplication MAC CE activating the PDCP packet duplication for the first radio bearer, the wireless device may perform the PDCP packet duplication procedure (e.g., may copy duplicate data in the second RLC entity) and may not transmit data from the duplicate (e.g., second) logical channel corresponding to the first radio bearer. In an example, the wireless device may transmit data from the duplicate (e.g., second) logical channel, in response to at least one cell in the one or more second cells being activated. In an example, the wireless device may not perform the packet duplication procedure (e.g., may not copy duplicate data in the second RLC entity) in response to none of cells in the one or more second cells corresponding to the first radio bearer being activated when the wireless device receives the PDCP packet duplication MAC CE activating packet duplication for the first radio bearer. In an example, the wireless device may start performing the packet duplication for the first radio bearer in response to at least one cell in the one or more second cells being activated within a time window in response to receiving the PDCP packet duplication MAC CE. In an example, the wireless device may start a timer in response to receiving the packet duplication MAC CE and the wireless device may start performing the packet duplication for the first radio bearer in response to at least one cell in the one or more second cells being activated while the timer is running. In an example, the configured time window and/or the timer value may be RRC configured. In an example, the configured time window and/or the timer value may be indicated in the PDCP packet duplication MAC CE activating the PDCP packet duplication for the first radio bearer. The time window and/or the timer value may be indicated to the wireless device using other signaling mechanisms.

In an example, a UE causing interruptions during measurements on deactivated SCC may indicate to the network a need for an interruption control pattern. In an example, interruptions at SCell addition/release, activation/deactivation and during measurements on SCC may not be required by all UEs. In an example, interruptions during SRS carrier based switching between the configured component carriers may not be required by all UEs. In an example, the interruptions may not interrupt RRC signalling or ACK/NACKs related to RRC reconfiguration procedure for SCell addition/release or MAC control signalling for SCell activation/deactivation command.

In an example, interruptions may be allowed at SCell addition/release for intra-band CA. In an example, when an intra-band SCell is added or released, the UE may be allowed an interruption of up to 5 subframes on PCell during the RRC reconfiguration procedure. This interruption may be for both uplink and downlink of PCell.

In an example, interruptions may be allowed at SCell addition/release for inter-band CA. In an example, when an inter-band SCell is added or released, the UE that requires interruption may be allowed an interruption of up to 1 subframe on PCell during the RRC reconfiguration procedure. This interruption may be for both uplink and downlink of PCell.

In an example, interruptions may be allowed at SCell activation/deactivation for intra-band CA. In an example, when an intra-band SCell is activated or deactivated, the UE may be allowed an interruption of up to 5 subframes on PCell during the activation/deactivation delay defined. This interruption may be for both uplink and downlink of PCell.

In an example, interruptions may be allowed at SCell activation/deactivation for inter-band CA. In an example, when an inter-band SCell is activated or deactivated, the UE that requires interruption may be allowed an interruption of up to 1 subframe on PCell during the activation/deactivation delay. This interruption may be for both uplink and downlink of PCell.

In an example, interruptions may be allowed during measurements on SCC for intra-band CA. In an example, if the UE supports ncsg-r14 and has been configured with gap pattern with ID 0,1 and there is no inter-frequency and inter-RAT frequency layer to be monitored, the UE may not make any autonomous interruptions outside of the configured gap patterns.

In an example, PCell interruptions due to measurements on SCC when the SCell may be deactivated are allowed with up to 0.5% probability of missed ACK/NACK when the configured measCycleSCell is 640 ms or longer.

In an example, if indicated by the network using IE allowInterruptions, PCell interruptions due to measurements on SCC when the SCell is deactivated may be allowed with up to 0.5% probability of missed ACK/NACK regardless of the configured measCycleSCell. In an example, each interruption may not exceed 5 subframes.

In an example, interruptions may be allowed during measurements on SCC for inter-band CA. In an example, if the UE supports ncsg-r14 and has been configured with NCSG pattern with ID 0, 1, 2, 3, the UE may not make any autonomous interruptions outside of the configured gap patterns.

In an example, if the UE has been configured with gap pattern with ID 0,1 and there is no inter-frequency and inter-RAT frequency layer to be monitored, the UE may not make any autonomous interruptions outside of the configured gap patterns. In an example, if the UE does not support ncsg-r14 or has not been configured with gap pattern with ID 0,1 or NCSG pattern with ID 0, 1, 2, 3 or the UE has been configured with gap pattern with ID 0,1 to monitor inter-frequency/inter-RAT frequency layers, PCell interruptions due to measurements on SCC when the SCell is deactivated may be allowed with up to 0.5% probability of missed ACK/NACK when the configured measCycleSCell is 640 ms or longer.

In an example, if the UE does not support ncsg-r14 or has not been configured with gap pattern with ID 0,1 or NCSG pattern with ID 0, 1, 2, 3 or the UE has been configured with gap pattern with ID 0,1 to monitor inter-frequency/inter-RAT frequency layers, and if indicated by the network using IE allowInterruptions, PCell interruptions due to measurements on SCC when the SCell is deactivated may be allowed with up to 0.5% probability of missed ACK/NACK regardless of the configured measCycleSCell. In an example, an interruption may not exceed 1 subframe.

In an example, interruptions may be allowed at SCell addition/release with multiple downlink SCells. In an example, when any number of SCells between one and four is added or released using the same RRCConnectionReconfiguration message, the UE may be allowed an interruption on PCell and on any activated SCell during the RRC reconfiguration procedure. For example, an interruption on PCell may be allowed of up to 1 subframe, if the PCell is not in the same band as any of the SCells being added or released. In an example, an interruption on PCell may be allowed of up to 5 subframes, if the PCell is in the same band as any of the SCells being added or released. In an example, an interruption on any activated SCell may be allowed of up to 1 subframe, if the activated SCell is not in the same band as any of the SCells being added or released. In an example, an interruption on any activated SCell may be allowed of up to 5 subframes, if the activated SCell is in the same band as any of the SCells being added or released.

In an example, interruptions may be allowed at SCell activation/deactivation with multiple downlink SCells. In an example, when any number of SCells between one and four is activated or deactivated using the same MAC control element, the UE may be allowed an interruption on PCell and on any activated SCell during the SCell activation/deactivation procedure. For example, an interruption on PCell may be allowed of up to 1 subframe, if the PCell is not in the same band as any of the SCells being activated or deactivated. In an example, an interruption on PCell may be allowed of up to 5 subframes, if the PCell is in the same band as any of the SCells being activated or deactivated. In an example, an interruption on any activated SCell may be allowed of up to 1 subframe, if the activated SCell is not in the same band as any of the SCells being activated or deactivated. In an example, an interruption on any activated SCell may be allowed of up to 5 subframes, if the activated SCell is in the same band as any of the SCells being activated or deactivated.

In an example, interruptions may be allowed during measurements on SCC with multiple downlink SCells. In an example, if the PCell is not in the same band as any of the SCells being activated or deactivated and if the UE supports ncsg-r14 and has been configured with NCSG pattern with ID 0, 1, 2, 3, the UE may not make any autonomous interruptions outside of the configured gap patterns.

In an example, if the PCell is not in the same band as any of the SCells being activated or deactivated and if the UE has been configured with gap pattern with ID 0,1 and there is no inter-frequency and inter-RAT frequency layer to be monitored, the UE may not make any autonomous interruptions outside of the configured gap patterns.

In an example, if the PCell is in the same band as any of the SCells being activated or deactivated or if the UE does not support ncsg-r14 or has not been configured with gap pattern with ID 0,1 or NCSG pattern with ID 0, 1, 2, 3 or the UE has been configured with gap pattern with ID 0,1 to monitor inter-frequency/inter-RAT frequency layers, when one SCell is deactivated, the UE may be allowed due to measurements on the SCC with deactivated SCell, an interruption on PCell with up to 0.5% probability of missed ACK/NACK when the configured measCycleSCell for the deactivated SCell is 640 ms or longer. In an example, the UE may be allowed due to measurements on the SCC with deactivated SCell, an interruption on PCell with up to 0.5% probability of missed ACK/NACK regardless of the configured measCycleSCell for the deactivated SCell if indicated by the network using IE allowInterruptions. In an example, an interruption may not exceed 1 subframes if the PCell is not in the same band as the deactivated SCell. In an example, an interruption may not exceed 5 subframes if the PCell is in the same band as the deactivated SCell. In an example, an interruption on any activated SCell with up to 0.5% probability of missed ACK/NACK when the configured measCycleSCell [2] for the deactivated SCell is 640 ms or longer. In an example, the UE may be allowed due to measurements on the SCC with deactivated SCell, an interruption on any activated SCell with up to 0.5% probability of missed ACK/NACK regardless of the configured measCycleSCell for the deactivated SCell if indicated by the network using IE allowInterruptions. In an example, an interruption may not exceed 1 subframes if the activated SCell is not in the same band as the deactivated SCell. In an example, an interruption may not exceed 5 subframes if the activated SCell is in the same band as the deactivated SCell.

In an example, if the PCell is in the same band as any of the SCells being activated or deactivated or if the UE does not support ncsg-r14 or has not been configured with gap pattern with ID 0,1 or NCSG pattern with ID 0, 1, 2, 3 or the UE has been configured with gap pattern with ID 0,1 to monitor inter-frequency/inter-RAT frequency layers, when two, three, or four SCells are deactivated, the UE may be allowed due to measurements on the SCCs with deactivated SCells an interruption on PCell with up to 0.5% probability of missed ACK/NACK when any of the configured measCycleSCell for the deactivated SCells is 640 ms or longer. In an example, the UE may be allowed due to measurements on the SCCs with deactivated SCells an interruption on PCell with up to 0.5% probability of missed ACK/NACK regardless of the configured measCycleSCell [2] for the deactivated SCells if indicated by the network using IE allowInterruptions. In an example, the UE may be allowed due to measurements on the SCCs with deactivated SCells an interruption on an activated SCell with up to 0.5% probability of missed ACK/NACK when any of the configured measCycleSCell for the deactivated SCells is 640 ms or longer. In an example, the UE may be allowed due to measurements on the SCCs with deactivated SCells an interruption on an activated SCell with up to 0.5% probability of missed ACK/NACK regardless of the configured measCycleSCell [2] for the deactivated SCells if indicated by the network using IE allowInterruptions. An interruption on the PCell may not exceed 1 subframes if the PCell is not in the same band as any of the deactivated SCells. In an example, an interruption on the PCell may not exceed 5 subframes if the PCell is in the same band as any of the deactivated SCells. In an example, an interruption on the activated Cell may not exceed 1 subframe if the activated SCell is not in the same band as any of the deactivated SCells. In an example, an interruption on the activated Cell may not exceed 5 subframes if the the activated SCell is in the same band as any of the deactivated SCells.

In an example, interruptions may be allowed at overlapping addition/release/activation/deactivation of SCells. In an example, if a UE is commanded by the network to sequentially add/release/activate/deactivate SCells, and a new procedure of addition/release/activation/deactivation of SCell(s) takes place before the completion of previous procedure of addition/release/activation/deactivation of SCell(s), the interruptions on PCell due to sequential addition/release/activation/deactivation of SCells may not exceed the sum of the allowed interruptions on the PCell caused by each of the addition/release/activation/deactivation procedures, and the interruptions on already activated SCell due to sequential addition/release/activation/deactivation of SCells may not exceed the sum of the allowed interruptions on the SCell caused by each of the addition/release/activation/deactivation procedures.

In an example, interruptions may be allowed during RSSI measurements on one SCC under Frame Structure 3. In an example, PCell interruptions due to RSSI measurements on SCC when the SCell is deactivated are allowed with up to 0.5% probability of missed ACK/NACK when any of the configured rmtc-Period and measCycleSCell is 640 ms or longer. In an example, an allowed interruption on the PCell may not exceed 1 subframe.

In an example, interruptions may be allowed during RSSI measurements on multiple SCCs under Frame Structure 3. In an example, if the UE supports ncsg-r14 and has been configured with NCSG pattern with ID 0, 1, 2, 3, the UE may not make any autonomous interruptions outside of the configured gap patterns. In an example, if the UE has been configured with gap pattern with ID 0,1 and there is no inter-frequency and inter-RAT frequency layer to be monitored, the UE may not make any autonomous interruptions outside of the configured gap patterns.

In an example, if the UE does not support ncsg-r14 or has not been configured with gap pattern with ID 0,1 or NCSG pattern with ID 0, 1, 2, 3 or the UE has been configured with gap pattern with ID 0,1 to monitor inter-frequency/inter-RAT frequency layers, and if one SCell is deactivated, the UE may be allowed due to RSSI measurements on the SCC with deactivated SCell, an interruption on PCell with up to 0.5% probability of missed ACK/NACK when any of the configured rmtc-Period and the configured measCycleSCell for the deactivated SCell is 640 ms or longer. In an example, the UE may be allowed due to RSSI measurements on the SCC with deactivated SCell, an interruption on any activated SCell with up to 0.5% probability of missed ACK/NACK when any of the configured rmtc-Period and the configured measCycleSCell for the deactivated SCell is 640 ms or longer. In an example, no interruption may be allowed if both of the configured rmtc-Period and the configured measCycleSCell for the deactivated SCell are below 640 ms.

In an example, if the UE does not support ncsg-r14 or has not been configured with gap pattern with ID 0,1 or NCSG pattern with ID 0, 1, 2, 3 or the UE has been configured with gap pattern with ID 0,1 to monitor inter-frequency/inter-RAT frequency layers and if two, three, or four SCells are deactivated, the UE may be allowed due to RSSI measurements on the SCCs with deactivated SCells, an interruption on PCell with up to 0.5% probability of missed ACK/NACK when any of the configured rmtc-Period and the configured measCycleSCell for the deactivated SCells is 640 ms or longer, or RSSI windows with the length of measDuration for at least some of the SCCs with the deactivated SCells within their respective rmtc-Period are not within [20] ms, an interruption on an activated SCell with up to 0.5% probability of missed ACK/NACK when any of the configured rmtc-Period and the configured and the configured measCycleSCell for the deactivated SCells is 640 ms or longer, or RSSI windows with the length of measDuration for at least some of the SCCs with the deactivated SCells within their respective rmtc-Period are not within [20] ms.

In an example, no interruption may be allowed if both of the configured rmtc-Period and the configured measCycleSCell for the deactivated SCell are below 640 ms and RSSI windows with the length of measDuration for all the SCCs with the deactivated SCells within their respective rmtc-Period are within [20] ms. In an example, an allowed interruption may not exceed 1 subframe on the PCell, and 5 subframes on the activated SCell.

In an example, interruptions may be allowed at SRS carrier based switching. In an example, a PUSCH-less SCC may be a TDD SCC without PUCCH/PUSCH configured. When a UE needs to transmit periodic or aperiodic SRS and/or non-contention based PRACH on a PUSCH-less SCC, the UE may perform carrier based switching to one or more PUSCH-less SCCs from a CC with PUSCH or from another PUSCH-less SCC prior to transmitting SRS and/or PRACH, provided that: switching is from a configured CC to another activated TDD CC; the PUSCH-less SCCs to which SRS carrier based switching is performed is indicated by DCI SRS request field for aperiodic SRS transmission or configured via RRCfor periodic SRS transmission or indicated by PDCCH for PRACH; the CC from which SRS carrier based switching is performed is indicated by Idex-SwitchingFromCarrierlist; the SRS switching is not colliding with any other transmission with higher priority; the SRS switching is not colliding with PDCCH in subframe 0 and 5 as specified in; for UE, which does not support simultaneous reception and transmission for inter-band TDD CA, and is compliant to the requirements for inter-band CA with uplink in one E-UTRA band and without simultaneous Rx/Tx, the SRS or RACH transmission are not simultaneously scheduled with DL subframe #0 or DL subframe #5 on other CCs.

In an example, the UE may not perform SRS carrier based switching if the above conditions cannot be met. In an example, the interruption on PCC and each of the activated SCCs during the switching to the PUSCH-less SCC may not exceed 2 subframes including the first subframe where SRS transmission is configured on the PUSCH-less SCC. In an example, the interruption on PCC and each of the activated SCCs during the switching from the PUSCH-less SCC shall not exceed 2 subframes including the last subframe where SRS transmission may be configured on the PUSCH-less SCC.

In an example embodiment, a wireless device may receive one or more messages comprising one or more RRC messages. The one or more RRC messages may comprise configuration parameters for one or more cells. In an example, the one or more cells may comprise a primary cell and one or more secondary cells. The one or more RRC messages may comprise configuration parameters for one or more radio bearers. A radio bearer in the one or more radio bearers may be a data radio bearers (DRB) or a signaling radio bearer (SRB). The one or more RRC messages may comprise configuration parameters for one or more logical channels. A logical channel in the one or more logical channels may be associated with one or more buffers. The one or more messages may comprise configuration parameters for packet data convergence protocol (PDCP) packet duplication. In an example, the PDCP packet duplication configuration parameters may indicate that one or more radio bearers (e.g., one or more DRBs and/or one or more SRBs) are configured with PDCP packet duplication. In an example, a first radio bearer in the one or more radio bearers may be configured with and/or activated for PDCP packet duplication. In an example, a radio bearer may be configured and activated for PDCP packet duplication with RRC configuration. A radio bearer configured for PDCP packet duplication may be also activated for PDCP duplication, e.g., the wireless device may start the PDCP packet duplication for the radio bearer upon receiving an RRC configuration message configuring PDCP packet duplication for the radio bearer. In an example, the radio bearer may be configured for PDCP packet duplication with RRC and may be activated/deactivated for PDCP packet duplication with MAC CE. The first radio bearer may be mapped by the PDCP layer to a plurality of (e.g., two) radio link control (RLC) entities (e.g., a first RLC entity and a second RLC entity). In an example, the wireless device may enable the second RLC entity upon activation of PDCP packet duplication for the first radio bearer. In an example, the wireless device may disable the second RLC entity upon deactivation of PDCP packet duplication for the first radio bearer. In an example, the first RLC entity and the second RLC entity, corresponding to the first radio bearer, may correspond to a first logical channel and a second logical channel (e.g., duplicate for the first logical channel), respectively. In an example, the PDCP packet duplication configuration parameters may indicate mapping between the first logical channel and the second logical channel corresponding to the first radio bearer and different cells. In an example, the packet duplication configuration parameters and/or other configuration parameters may indicate the first logical channel may be mapped to at least one first cell and the second logical channel may be mapped to at least one second cell. The at least one first cell and the at least one second cell may be different. In an example, the packet duplication configuration parameters and/or other configuration parameters may indicate the first logical channel and the second logical channel may be mapped to different cells without specifying the cells and/or locking the first logical channel or the second logical channel to a cell. In an example, the wireless device may receive, in downlink control channel (e.g., PDCCH/EPDCCH) a downlink assignment, indicating downlink resource for one or more downlink transport blocks (TBs). The downlink assignment may comprise HARQ related parameters for the one or more TBs, power control parameters for one or more uplink transmission, and/or other parameters for reception of the one or more TBs. The wireless device may receive the one or more TBs in the resources indicated by the downlink assignment downlink control information (DCI). The wireless device may receive a PDCP duplication MAC CE, for example, in a MAC header corresponding to the one or more TBs. The PDCP duplication MAC CE may control the PDCP duplication for the wireless device.

In an example, the wireless device may receive a PDCP duplication MAC CE. The PDCP duplication MAC CE may activate the packet duplication for one or more radio bearers comprising the first radio bearer. The one or more radio bearers may be configured for packet duplication with RRC. The PDCP duplication MAC CE may comprise a bitmap corresponding to radio bearers configured with duplication. The bitmap may indicate which radio bearer(s) among the radio bearers configured with duplication are activated for duplication and/or which radio bearer(s) among the radio bearers configured with duplication are deactivated for duplication. In an example, RRC may indicate which logical channels may be used for the duplicate leg (e.g., the one or more second cells corresponding to the second logical channel). In an example, the wireless device may activate the at least one second cell corresponding to the duplicate logical channel (e.g., the second logical channel corresponding to the first radio bearer) in response to receiving the PDCP duplication MAC CE activating the PDCP duplication for the first radio bearer and the at least one second logical channel being deactivated.

Figure 16:
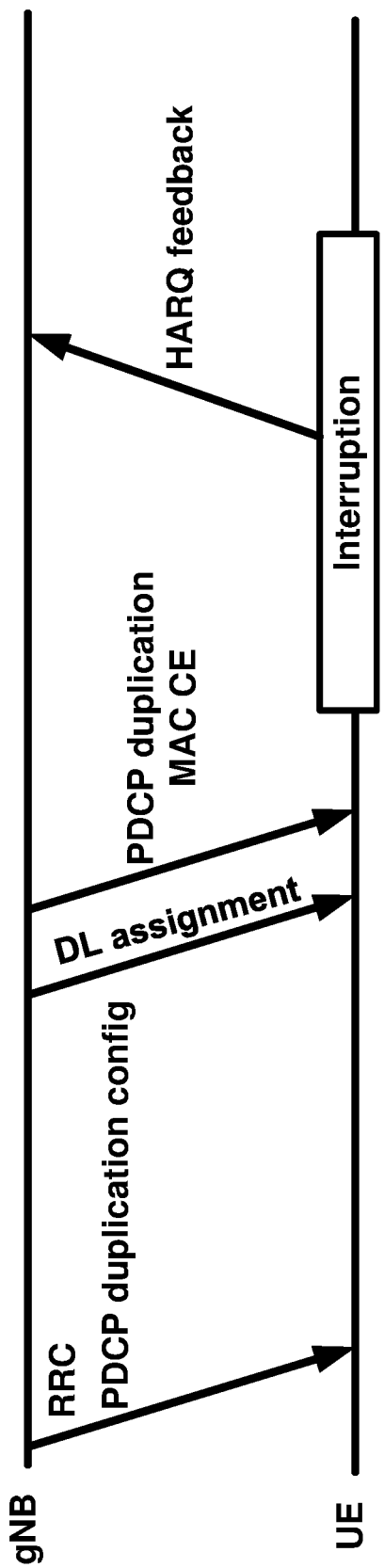
FIG. 16 is an example packet duplication procedure as per an aspect of an embodiment of the present invention.

In an example embodiment, the reception of the PDCP duplication MAC CE activating the PDCP duplication for the first radio bearer may have the impact of receiving a cell activation/deactivation MAC CE activating the at least one second cell in response to the at least one second cell not being activated in response to receiving the PDCP duplication MAC CE. In an example embodiment, the wireless device may transmit HARQ feedback corresponding to the one or more TBs along which (e.g., in the MAC header) the PDCP duplication MAC CE is received. The HARQ feedback may indicate ACK in response to correctly decoding the one or more TBs or NACK in response to incorrectly decoding the one or more TBs. In an example, a cell may experience an interruption in response to one or more criteria. The interruption may cause an interruption/discontinuity of operation (e.g., interruption/discontinuity in transmitting or receiving signals, etc.) for the cell. The one or more criteria may comprise interruptions at SCell addition/release for intra-band carrier aggregation and/or interruptions at SCell addition/release for inter-band carrier aggregation and/or interruption at SCell activation/deactivation for intra-band carrier aggregation and/or interruption at SCell activation/deactivation for inter-band carrier aggregation and/or interruptions during measurements on secondary component carrier for intra-band carrier aggregation and/or interruptions during measurements on secondary component carrier for inter-band carrier aggregation and/or interruptions at SCell addition/release with multiple downlink SCells and/or interruptions at SCell activation/deactivation with multiple downlink SCells and/or interruptions during measurements on secondary component carrier with multiple downlink SCell and/or interruptions at overlapping addition/release/activation/deactivation of DCells and/or interruptions during RSSI measurements on one SCell under frames structure 3 and/or interruptions during RSSI measurements on multiple secondary component carriers under frame structure type 3 and/or interruptions at SRS based switching. In an example embodiment, the wireless device may transmit the HARQ feedback corresponding to the one or more TBs without impact from PCell and/or PSCell and/or SCell (e.g., PUSCH SCell) interruption. An example procedure is shown in FIG. 16. In an example, in response to transmitting HARQ feedback corresponding to the one or more TB, the corresponding cell may not be interrupted. In an example, the wireless device may indicate (e.g., using RRC, physical layer or MAC layer signaling) to the base station that the corresponding cell where the HARQ feedback is transmitted is not interrupted.

In an example embodiment, the wireless device may receive a second downlink assignment for one or more second TBs. The wireless device may receive a second PDCP duplication MAC CE along with the one or more second TB (e.g., in MAC headers associate with the one or more second TB). The second PDCP duplication MAC CE may deactivate the PDCP duplication for the first radio bearer. In an example, an earlier PDCP duplication may have activated the at least one second cell corresponding to the second logical channel (e.g., duplicate logical channel), for example when the at least one second cell is in a deactivated state in response to receiving the earlier PDCP duplication MAC CE. In an example, the wireless device may deactivate the at least one second cell in response to receiving the second PDCP duplication MAC CE deactivating the PDCP duplication for the first radio bearer. In an example, the wireless device may resume the deactivated state for the at least one second cell in response to receiving the PDCP duplication MAC CE deactivating the PDCP duplication foe the first radio bearer. In example, receiving the second PDCP duplication MAC CE may have same effect and/or may lead to same procedures as receiving a cell activation/deactivation MAC CE deactivating the at least one second cell. In an example embodiment, the wireless device may transmit the HARQ feedback corresponding to the one or more second TBs without impact from PCell and/or PSCell and/or SCell (e.g., PUSCH SCell) interruption. In an example, in response to transmitting HARQ feedback corresponding to the one or more second TB, the corresponding cell may not be interrupted. In an example, the wireless device may indicate (e.g., using RRC, physical layer or MAC layer signaling) to the base station that the corresponding cell where the HARQ feedback is transmitted is not interrupted.

In an example, the MAC layer may provide data transfer services on logical channel. In an example, different logical channel types may be defined/configured for different kinds of data transfer services. In an example, a logical channel type may be defined by what type of information is transferred. In an example, the wireless device may perform a logical channel prioritization procedure (LCP) when a new transmission is performed. The LCP may determine the logical channels multiplexed in a transport block. A logical channel may be associated with buffers at the RLC layer and/or PDCP layer, etc.

In an example, an IE (e.g., LogicalChannelConfig) may be used to configure the logical channel parameters. An example, LogicalChannelConfig IE may be as follows:

```
LogicalChannelConfig ::=        SEQUENCE {
    ul-SpecificParameters       SEQUENCE {
        priority                INTEGER (1..16),
        prioritisedBitRate      ENUMERATED {kBps0, kBps8,
kBps16, kBps32, kBps64, kBps128,kBps256, infinity, kBps512-
v1020, kBps1024-v1020,kBps2048-v1020, spare5, spare4, spare3,
spare2,spare1},
        bucketSizeDuration      ENUMERATED {ms50, ms100,
ms150, ms300, ms500, ms1000, spare2,spare1},
        logicalChannelGroup     INTEGER (0..3)
OPTIONAL        -- Need OR
    }       OPTIONAL,                                       --
Cond UL
    ...,
    [[ logicalChannelSR-Mask-r9     ENUMERATED {setup}
OPTIONAL        -- Cond SRmask
    ]],
    [[ logicalChannelSR-Prohibit-r12    BOOLEAN         OPTIONAL
        -- Need ON
    ]],
    [[ laa-Allowed-r14              BOOLEAN         OPTIONAL,
    -- Need ON
        bitRateQueryProhibitTimer-r14ENUMERATED {s0, s0dot4,
s0dot8, s1dot6, s3, s6, s12,s30}        OPTIONAL        --Need
OR
    ]]
}
```

In an example, bitRateQueryProhibitTimer may be used for bit rate recommendation query in seconds. In an example, bucketSieDuration may be used for logical channel prioritization. In an example, laa-Allowed may indicate whether the data of a logical channel is allowed to be transmitted via UL of LAA SCells. Value TRUE may indicate that the logical channel is allowed to be sent via UL of LAA SCells. Value FALSE may indicate that the logical channel is not allowed to be sent via UL of LAA SCells. In an example, logicalChannelGroup may indicate mapping of logical channel to logical channel group for BSR resporting. In an example, logicalChannelSR-Mask may control SR triggering on a logical channel basis when an uplink grant is configured. In an example, value TRUE for logicalChannelSR-Prohibit may indicate that the logicalChannelSR-ProhibitTimer is enabled for the logical channel. In an example, logicalChannelSR-Prohibit may be configured if logicalChannelSR-Prohibit is configured. In an example, prioritisedBitRate may indicate Prioritized bit rate for logical channel prioritisation. In an example, priority may indicate priority for logical channel prioritization procedure.

In an example embodiment, a wireless device may receive one or more messages comprising one or more RRC messages. The one or more RRC messages may comprise configuration parameters for one or more cells. In an example, the one or more cells may comprise a primary cell and one or more secondary cells. The one or more RRC messages may comprise configuration parameters for one or more radio bearers. A radio bearer in the one or more radio bearers may be a data radio bearers (DRB) or a signaling radio bearer (SRB). The one or more RRC messages may comprise configuration parameters for one or more logical channels. A logical channel in the one or more logical channels may be associated with one or more buffers. The one or more messages may comprise configuration parameters for packet data convergence protocol (PDCP) packet duplication. In an example, the PDCP packet duplication configuration parameters may indicate that one or more radio bearers (e.g., one or more DRBs and/or one or more SRBs) are configured with PDCP packet duplication. In an example, a first radio bearer in the one or more radio bearers may be configured with and/or activated for PDCP packet duplication. In an example, a radio bearer may be configured and activated for PDCP packet duplication with RRC configuration. A radio bearer configured for PDCP packet duplication may be also activated for PDCP duplication, e.g., the wireless device may start the PDCP packet duplication for the radio bearer upon receiving an RRC configuration message configuring PDCP packet duplication for the radio bearer. In an example, the radio bearer may be configured for PDCP packet duplication with RRC and may be activated/deactivated for PDCP packet duplication with MAC CE. The first radio bearer may be mapped by the PDCP layer to a plurality of (e.g., two) radio link control (RLC) entities (e.g., a first RLC entity and a second RLC entity). In an example, the wireless device may enable the second RLC entity upon activation of PDCP packet duplication for the first radio bearer. In an example, the wireless device may disable the second RLC entity upon deactivation of PDCP packet duplication for the first radio bearer. In an example, the first RLC entity and the second RLC entity, corresponding to the first radio bearer, may correspond to a first logical channel and a second logical channel (e.g., duplicate for the first logical channel), respectively. In an example, the PDCP packet duplication configuration parameters may indicate mapping between the first logical channel and the second logical channel corresponding to the first radio bearer and different cells. In an example, the packet duplication configuration parameters and/or other configuration parameters may indicate the first logical channel may be mapped to at least one first cell and the second logical channel may be mapped to at least one second cell. The at least one first cell and the at least one second cell may be different. In an example, the packet duplication configuration parameters and/or other configuration parameters may indicate the first logical channel and the second logical channel may be mapped to different cells without specifying the cells and/or locking the first logical channel or the second logical channel to a cell. In an example, the one or more RRC messages may comprise one or more first timer values. In an example, the one or more first timer values may correspond to deactivation of secondary cells in the one or more cells. In an example, the one or more first timer values may be configured separately from one or more second timer values for deactivation of secondary cells in the one or more cells. In an example, the one or more first timer values may be part of the PDCP duplication configuration parameters.

Figure 17:
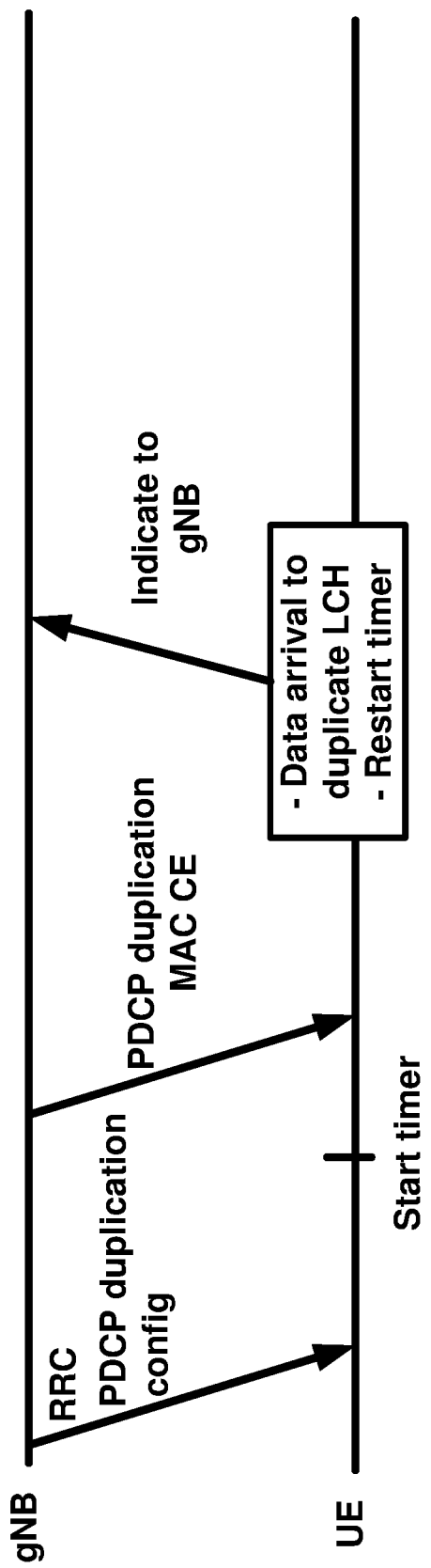
FIG. 17 is an example packet duplication procedure as per an aspect of an embodiment of the present invention.

In an example embodiment, the wireless device may receive a PDCP duplication MAC CE. The PDCP duplication MAC CE may activate the packet duplication for one or more radio bearers comprising the first radio bearer. The one or more radio bearers may be configured for packet duplication with RRC. The PDCP duplication MAC CE may comprise a bitmap corresponding to radio bearers configured with duplication. The bitmap may indicate which radio bearer(s) among the radio bearers configured with duplication are activated for duplication and/or which radio bearer(s) among the radio bearers configured with duplication are deactivated for duplication. In an example, RRC may indicate which logical channels may be used for the duplicate leg (e.g., the one or more second cells corresponding to the second logical channel). In an example, the wireless device may activate at least one cell in the at least one second cell corresponding to the duplicate logical channel (e.g., the second logical channel corresponding to the first radio bearer) in response to receiving the PDCP duplication MAC CE activating the PDCP duplication for the first radio bearer and the at least one second logical channel being deactivated. In an example embodiment, the reception of the PDCP duplication MAC CE activating the PDCP duplication for the first radio bearer may have the impact of receiving a cell activation/deactivation MAC CE activating at least one cell in the at least one second cell in response to the at least one second cell not being activated in response to receiving the PDCP duplication MAC CE. In an example embodiment, the wireless device may (re)start at least one timer corresponding to the at least one second cell in response to arrival of data to buffer(s) associated with the second logical channel (e.g., duplicate logical channel) corresponding to the first radio bearer. An example procedure is shown in FIG. 17. The at least one timer may be (re)started with corresponding RRC configured timer values. The at least one second cell may remain activated as long as the at least one timer is running. In an example embodiment, the wireless device may keep the at least one second cell activated as long as there is data available in the buffers associated with the second logical channel corresponding to the first radio bearer. In an example, the wireless device may notify/indicate the base station that the at least one second logical channel is activated in response to one or more SCell deactivation timer corresponding to the at least one second cell being expired. In an example, the notification/indication may be in form of RRC and/or physical layer (e.g., UCI) and/or MAC layer (e.g., MAC CE) signaling.

In an example embodiment, a wireless device may receive one or more messages comprising one or more RRC messages. The one or more messages may comprise configuration parameters for a plurality of cells. The plurality of cells may comprise a primary cell and one or more secondary cells. In an example, the one or more messages may comprise one or more timer values for deactivation of one or more secondary cells in the plurality of cells. The one or more timer values may enable implicit cell deactivation for the one or more secondary cells in the plurality of cells. The wireless device may start a timer with a configured timer value for a secondary cell in the one or more secondary cells in response to one or more criteria (e.g., receiving a grant and/or an activation MAC CE activating the secondary cell). The wireless device may implicitly deactivate a secondary cell in response to a deactivation timer corresponding to the secondary cell expiring. The one or more messages may comprise configuration parameters for packet duplication. In an example, the packet duplication configuration parameters may indicate one or more radio bearers (e.g., one or more data radio bearers (DRBs) and/or one or more signaling radio bearers (SRBs)) are configured with packet duplication. In an example, a first radio bearer in the one or more radio bearers may be configured with and/or activated for packet duplication. The first radio bearer may be mapped by the PDCP layer to a plurality of (e.g., two) RLC entities (e.g., a first RLC entity and a second RLC entity). In an example, the first RLC entity and the second RLC entity, corresponding to the first radio, may correspond to a first logical channel and a second logical channel (e.g., duplicate for the first logical channel), respectively. In an example, the packet duplication configuration parameters may indicate mapping between the first and the second logical channels corresponding to the first radio bearer and different cells. In an example, the packet duplication configuration parameters and/or other configuration parameters may indicate the first logical channel may be mapped to at least one first cell and the second logical channel may be mapped to at least one second cell. The at least one first cell and the at least one second cell may be different. In an example, the packet duplication configuration parameters and/or other configuration parameters may indicate the first logical channel and the second logical channel may be mapped to different cells without specifying the cells and/or locking the first logical channel or the second logical channel to a cell.

Figure 18:
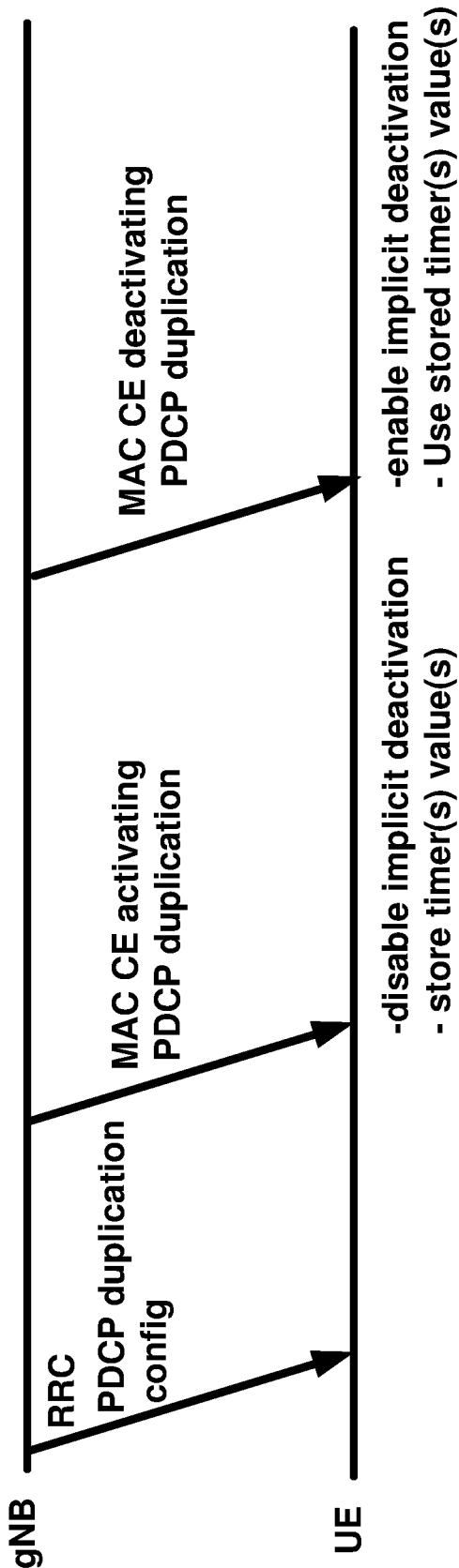
FIG. 18 is an example packet duplication procedure as per an aspect of an embodiment of the present invention.

In an example, the wireless device may receive a first PDCP duplication MAC CE. The first PDCP duplication MAC CE may activate the packet duplication for one or more radio bearers comprising the first radio bearer. The one or more radio bearers may be configured for packet duplication with RRC. The first PDCP duplication MAC CE may comprise a bitmap corresponding to radio bearers configured with duplication. The bitmap may indicate which radio bearer(s) among the radio bearers configured with duplication are activated for duplication and/or which radio bearer(s) among the radio bearers configured with duplication are deactivated for duplication. In an example, RRC may indicate which logical channels may be used for the duplicate leg (e.g., the one or more second cells corresponding to the second logical channel). In an example, the wireless device may not use implicit deactivation for the at least one second cell (e.g., cell(s) corresponding to the second (e.g., duplicate) logical channel) in response to receiving the first PDCP duplication activating PDCP duplication for the first radio bearer. An example is shown in FIG. 18. In an example, the wireless device may stop and/or disable the SCell deactivation timer for the secondary cells in the at least one second cell and/or may keep the at least one second cell in activated state as long as the PDCP packet duplication is activated for the first radio bearer. In an example embodiment, the wireless device may store the current value(s) associated with SCell deactivation timer(s) for the at least one second cell in response to receiving the first PDCP duplication MAC CE activating the PDCP duplication for the first radio bearer. The wireless device may disable/stop the SCell deactivation timer(s) for SCells in the at least one second cell in response to receiving the first PDCP duplication MAC CE activating the PDCP duplication for the first radio bearer. In an example embodiment, the wireless device may receive a second PDCP duplication MAC CE deactivating the PDCP duplication for the first radio bearer. In an example, the wireless device may enable the SCell deactivation timer(s) for the SCells in the at least one second cell in response to receiving the second PDCP duplication MAC CE deactivating the PDCP duplication for the first radio bearer. In an example, the wireless device may start the SCell deactivation timer(s) for the SCells in the at least one second cell with the stored values associated with the SCell deactivation timer(s) (e.g., stored values associated with SCell deactivation timer(s) in response to receiving the first PDCP duplication MAC CE activating the PDCP duplication for the first radio bearer) in response to receiving the second PDCP duplication deactivating the PDCP duplication for the first radio bearer. The wireless device may deactivate the SCells in the at least one second cell in response to SCell deactivation timer(s) associated with the SCells in the at least one second cell expiring.

Figure 19:
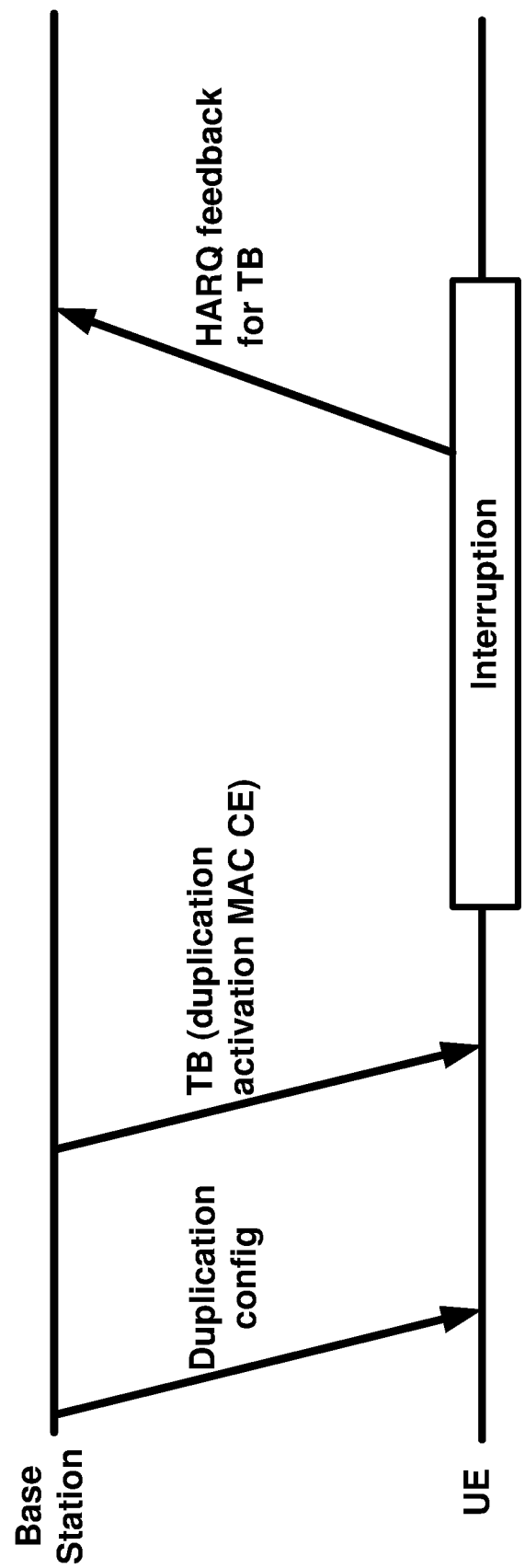
FIG. 19 is an example packet duplication procedure as per an aspect of an embodiment of the present invention.

In an example embodiment as shown in FIG. 19, a wireless device may receive a one or more messages comprising configuration parameters. The one or more messages may comprise a duplication configuration parameter for a bearer. In an example, the bearer may be a data radio bearer. In an example, the bearer may be a signaling radio bearer. The wireless device may receive a transport block comprising data and one or more control elements. The one or more control elements may comprise a control element indicating activation of the duplication for the bearer. In an example, the duplication may be a packet data convergence protocol (PDCP) duplication. In an example, the duplication configuration parameter of the bearer may indicate that the bearer is configured for duplication. In an example, the duplication configuration parameter for the bearer may be Boolean parameter with a value of TRUE or a value of FALSE. The value of TRUE may indicate that the bearer is configured with duplication and the value of FALSE may indicate that the bearer is not configured with the duplication.

In an example, the control element indicating activation of the duplication for the bearer may comprise a field indicating that bearer is activated. In an example, the field may comprise one or more octets. In an example, a bit in the one or more octets may correspond to the bearer. In an example a value of the bit may indicate whether the bearer is activated for duplication or not. In an example, the wireless device may activate one or more secondary cells in response to receiving the control element. In an example, the wireless device may receive one or more second control elements indicating activation of the one or more secondary cells. In an example, the one or more second control elements may be transmitted with the control element indicating activation of the duplication for the bearer. In an example, some of the one or more second control elements may be transmitted with the control element indicating activation of the duplication and some of the one or more second control elements may be transmitted in one or more other transport blocks.

In an example, in response to receiving the control element, the wireless device may interrupt one or more cells with uplink control channel. The interruption of a cell may cause in discontinuity in transmitting or receiving signals on the cell. In an example, the interruption may be in response to the activating the one or more secondary cells. In an example, a secondary cell in the one or more secondary cells may be an intra-band secondary cell. In an example, a secondary cell in the one or more secondary cells may be an inter-band secondary cell. In an example, the one or more cells may comprise a primary cell (PCell) and/or a primary secondary cell (PSCell) and/or a secondary cell with uplink control channel (PUCCH SCell). In an example, the one or more cells may comprise a cell. In an example, the wireless device may transmit, via the cell and during the interrupting, a hybrid automatic repeat request feedback corresponding to the transport block. In an example, the hybrid automatic repeat request feedback may be transmitted via the control channel of the cell.

Figure 20:
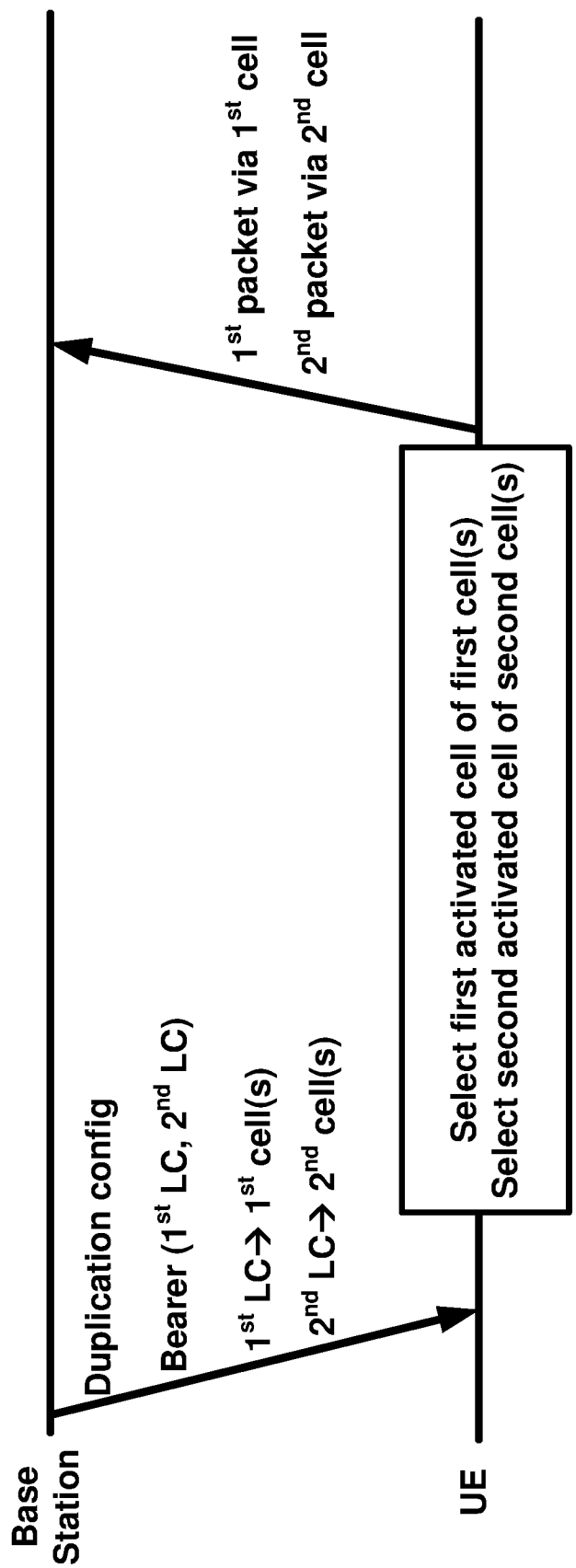
FIG. 20 is an example packet duplication procedure as per an aspect of an embodiment of the present invention.

In an example embodiment as shown in FIG. 20, a wireless device may receive one or more messages comprising configuration parameters. The one or more messages may comprise a duplication configuration parameter for a bearer. In an example, the bearer may be a data radio bearer. In an example, the bearer may be a signaling radio bearer. In an example, the bearer may be for data of a first type. In an example, the first type may be ultra-reliable low-latency communications (e.g., URLLC). In an example, the duplication may be a packet data convergence protocol (PDCP) duplication. In an example, the duplication configuration parameter of the bearer may indicate that the bearer is configured for duplication. In an example, the duplication configuration parameter for the bearer may be Boolean parameter with a value of TRUE or a value of FALSE. The value of TRUE may indicate that the bearer is configured with duplication and the value of FALSE may indicate that the bearer is not configured with the duplication. In an example, the bearer may be associated with a first logical channel and a second logical channel. In an example, the first logical channel may correspond to a first radio link entity. In an example, the first logical channel may deliver first data to a first radio link entity. In an example, the second logical channel may correspond to a second radio link entity. In an example, the second logical channel may deliver second data to a second radio link entity.

In an example, the one or more messages may comprise first configuration parameter indicating that the first logical channel is mapped to one or more first cells and the second logical channel is mapped to one or more second cells. In an example, the first configuration parameters may comprise a first allowedServingCells parameter in the configuration parameters of the first logical channel. The first allowedServingCells parameter may indicate one or more cells comprising the one or more first cells. In an example, the one or more first cells may be associated with one or more first priorities. In an example, the second configuration parameters may comprise a second allowedServingCells parameter in the configuration parameters of the second logical channel. The second allowedServingCells parameter may indicate one or more cells comprising the one or more second cells. In an example, the one or more second cells may be associated with one or more second priorities.

In an example, the wireless device may receive a control element indicating activation of the duplication for the bearer. In an example, the control element indicating activation of the duplication for the bearer may comprise a field indicating that bearer is activated. In an example, the field may comprise one or more octets. In an example, a bit in the one or more octets may correspond to the bearer. In an example a value of the bit may indicate whether the bearer is activated for duplication or not.

In an example, the wireless device may receive a first control element indicating activation of a first activate cell. In an example, the wireless device may receive a second control element indicating activation of a second activate cell. In an example, the wireless device may receive one or more control elements indicating activation of the first activated cell and the second activated cell.

In an example, the wireless device may select the first activated cell in the one or more first cells based on or more first priorities. In an example, at least a portion of the one or more first cells may be activated (e.g., both configured and activated). In an example, the first activated cell may have highest priority in one or more third activated cells of the one or more first cells. In an example, the wireless device may select the second activated cell in the one or more second cells based on one or more second priorities. In an example, at least a portion of the one or more second cells may be activated (e.g., both configured and activated). In an example, the second activated cell may have highest priority in one or more fourth activated cells of the one or more second cells. The wireless device may transmit a first packet corresponding to the bearer via the first activated cell. The wireless device may transmit a duplicate packet of the first packet via the second activated cell.

Figure 21:
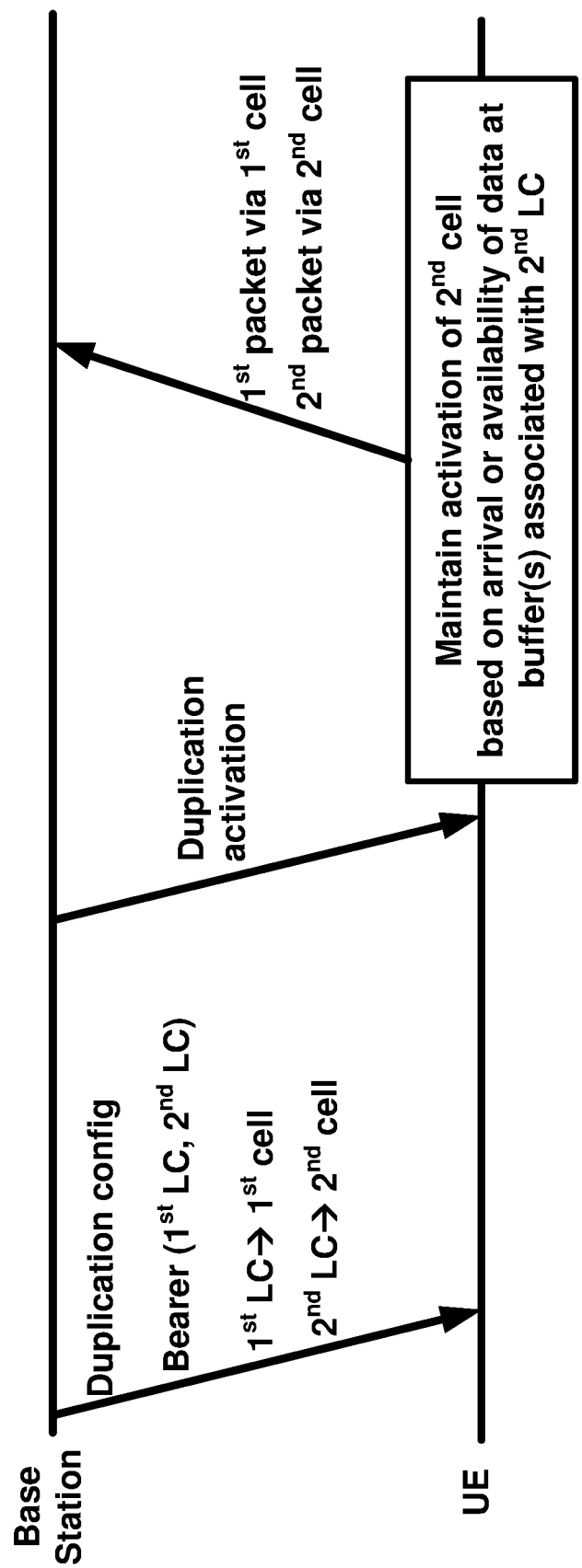
FIG. 21 is an example packet duplication procedure as per an aspect of an embodiment of the present invention.

In an example embodiment as shown in FIG. 21, a wireless device may receive one or more messages comprising configuration parameters. The one or more messages may comprise a duplication configuration parameter for a bearer. In an example, the bearer may be a data radio bearer. In an example, the bearer may be a signaling radio bearer. In an example, the bearer may be for data of a first type. In an example, the first type may be ultra-reliable low-latency communications (e.g., URLLC). In an example, the duplication may be a packet data convergence protocol (PDCP) duplication. In an example, the duplication configuration parameter of the bearer may indicate that the bearer is configured for duplication. In an example, the duplication configuration parameter for the bearer may be Boolean parameter with a value of TRUE or a value of FALSE. The value of TRUE may indicate that the bearer is configured with duplication and the value of FALSE may indicate that the bearer is not configured with the duplication. In an example, the bearer may be associated with a first logical channel and a second logical channel. In an example, the first logical channel may correspond to a first radio link entity. In an example, the first logical channel may deliver first data to a first radio link entity. In an example, the second logical channel may correspond to a second radio link entity. In an example, the second logical channel may deliver second data to a second radio link entity.

In an example, the one or more messages may comprise first configuration parameter indicating that the first logical channel is mapped to a first cell and the second logical channel is mapped to a second cell. In an example, the first configuration parameters may comprise a first allowedServingCells parameter in the configuration parameters of the first logical channel. The first allowedServingCells parameter may indicate one or more cells comprising the first cell. In an example, the second configuration parameters may comprise a second allowedServingCells parameter in the configuration parameters of the second logical channel. The second allowedServingCells parameter may indicate one or more cells comprising the second cell.

In an example, the wireless device may receive a control element indicating activation of the duplication for the bearer. In an example, the control element indicating activation of the duplication for the bearer may comprise a field indicating that bearer is activated. In an example, the field may comprise one or more octets. In an example, a bit in the one or more octets may correspond to the bearer. In an example a value of the bit may indicate whether the bearer is activated for duplication or not.

In an example, the wireless device may maintain activation of the second cell based on arrival or availability of data at one or more buffers associated with the second logical channel. In an example, the maintaining the activation of the second cell may comprise starting a timer of the second cell. In an example, the timer may be a deactivation timer of the second cell. In an example, the timer of the second cell may be started with a first value. In an example, the one or more messages (e.g., configuration parameters) may comprise/indicate the first value. In an example, the wireless device may transmit a message to the base station indicating that the maintain the activation of the second cell. In an example, the message may be transmitted via physical layer signaling (e.g., PUCCH) and/or MAC signaling (e.g., a MAC control element) and or RRC.

The wireless device may transmit a packet corresponding to the bearer via the first cell. The wireless device may transmit a duplicate of the first packet via the second cell in response to the second cell being activated.

Figure 22:
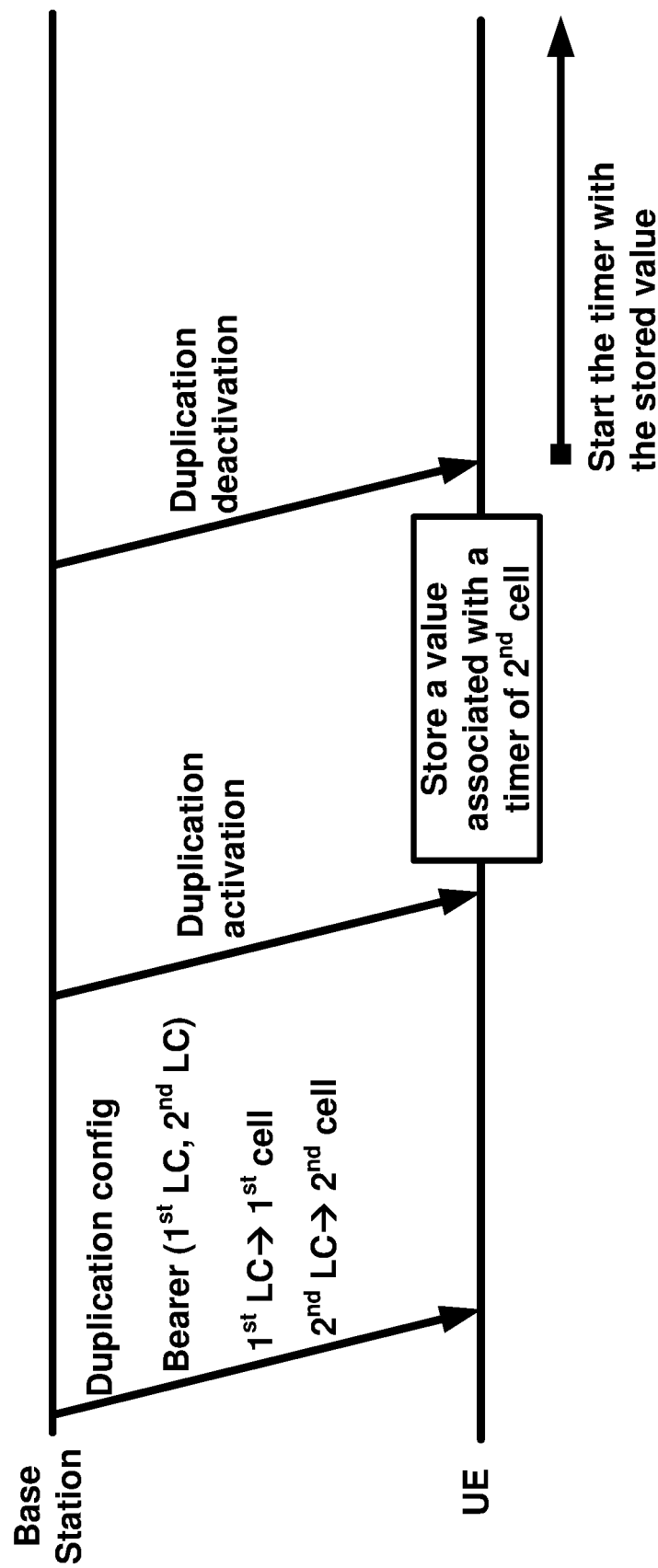
FIG. 22 is an example packet duplication procedure as per an aspect of an embodiment of the present invention.

In an example embodiment as shown in FIG. 22, a wireless device may receive one or more messages comprising configuration parameters. The one or more messages may comprise a duplication configuration parameter for a bearer. In an example, the bearer may be a data radio bearer. In an example, the bearer may be a signaling radio bearer. In an example, the bearer may be for data of a first type. In an example, the first type may be ultra-reliable low-latency communications (e.g., URLLC). In an example, the duplication may be a packet data convergence protocol (PDCP) duplication. In an example, the duplication configuration parameter of the bearer may indicate that the bearer is configured for duplication. In an example, the duplication configuration parameter for the bearer may be Boolean parameter with a value of TRUE or a value of FALSE. The value of TRUE may indicate that the bearer is configured with duplication and the value of FALSE may indicate that the bearer is not configured with the duplication. In an example, the bearer may be associated with a first logical channel and a second logical channel. In an example, the first logical channel may correspond to a first radio link entity. In an example, the first logical channel may deliver first data to a first radio link entity. In an example, the second logical channel may correspond to a second radio link entity. In an example, the second logical channel may deliver second data to a second radio link entity.

In an example, the one or more messages may comprise first configuration parameter indicating that the first logical channel is mapped to a first cell and the second logical channel is mapped to a second cell. In an example, the first configuration parameters may comprise a first allowedServingCells parameter in the configuration parameters of the first logical channel. The first allowedServingCells parameter may indicate one or more cells comprising the first cell. In an example, the second configuration parameters may comprise a second allowedServingCells parameter in the configuration parameters of the second logical channel. The second allowedServingCells parameter may indicate one or more cells comprising the second cell.

In an example, the wireless device may receive a first control element indicating activation of the duplication for the bearer. In an example, the first control element indicating activation of the duplication for the bearer may comprise a field indicating that bearer is activated. In an example, the field may comprise one or more octets. In an example, a bit in the one or more octets may correspond to the bearer. In an example a value of the bit may indicate whether the bearer is activated for duplication or not. In an example, the wireless device may store a value associated with a timer of the second cell in response to receiving the first control element.

In an example, the wireless device may disable the timer of the second cell in response to receiving the first control element indicating activation of the duplication for the bearer.

In an example, the wireless device may receive a second control element indicating deactivation of the duplication for the bearer. In an example, the second control element indicating deactivation of the duplication for the bearer may comprise a field indicating that bearer is deactivated. In an example, the field may comprise one or more octets. In an example, a bit in the one or more octets may correspond to the bearer. In an example a value of the bit may indicate that the bearer is deactivated for duplication. In an example, the wireless device may start the timer of the second cell with a first value. In an example, the wireless device may start the timer of the second cell with the first in response to receiving the second control element. In an example, the first value may be the stored value. In an example, the one or more messages (e.g., the configuration parameters) may indicate the first value. The wireless device may deactivate the second cell in response to the timer expiring.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 23:
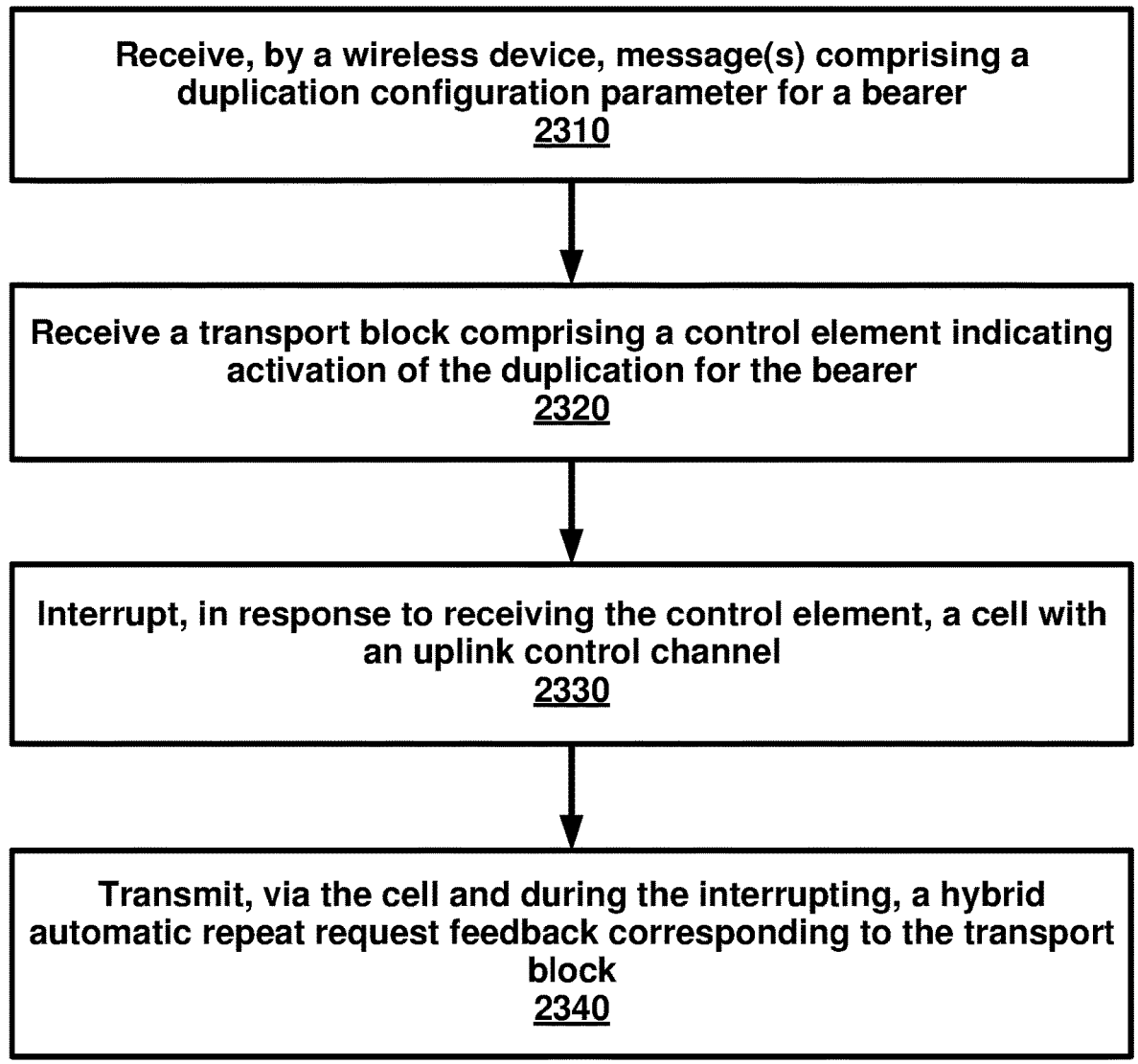
FIG. 23 is a flow diagram of an aspect of an embodiment of the present disclosure.

FIG. 23 is an example flow diagram as per an aspect of an embodiment of the present disclosure. At 2310, a wireless device may receive one or more messages. The one or more messages may comprise a duplication configuration parameter for a bearer. A transport block may be received at 2320. The transport block may comprise a control element indicating activation of the duplication for the bearer. At 2330, a cell with an uplink control channel may be interrupted in response to receiving the control element. At 2340, a hybrid automatic repeat request feedback may be transmitted via the cell during the interrupting. The hybrid automatic repeat request feedback may correspond to the transport block.

According to an example embodiment, the cell may be a primary cell, a primary secondary cell, or a secondary cell. According to an example embodiment, one or more secondary cells may be activated in response to receiving the control element. According to an example embodiment, the interruption may be in response to the activating of the one or more secondary cells. According to an example embodiment, a secondary cell in the one or more secondary cells may be an intra-band secondary cell. According to an example embodiment, a secondary cell in the one or more secondary cells may be an inter-band secondary cell.

According to an example embodiment, one or more second control elements may be received. The one or more second control elements may indicate activation of one or more secondary cells. Data of the bearer may be transmitted via the one or more secondary cells. According to an example embodiment, the interrupting may be in response to the activation of the one or more secondary cells. According to an example embodiment, a secondary cell in the one or more secondary cells may be an intra-band secondary cell. According to an example embodiment, a secondary cell in the one or more secondary cells may be an inter-band secondary cell.

According to an example embodiment, the duplication may be a packet data convergence protocol duplication. According to an example embodiment, the interruption on a cell may cause discontinuity in transmitting or receiving signals on the cell. According to an example embodiment, the duplication configuration parameter for the bearers may indicate that the bearer is configured with duplication. According to an example embodiment, the bearer may be a data radio bearer. According to an example embodiment, the bearer may be a signaling radio bearer. The method of claim 1, the interrupting a cell may cause discontinuity in transmitting signals on the cell. According to an example embodiment, the hybrid automatic repeat request feedback may be transmitted via the control channel of the cell. According to an example embodiment, the duplication configuration parameters for the plurality of bearers may indicate that the plurality of bearers are configured with duplication. According to an example embodiment, the bearer may be a data radio bearer. According to an example embodiment, the bearer may be a signaling radio bearer.

FIG. 24 is an example flow diagram as per an aspect of an embodiment of the present disclosure. At 2410, a wireless device may receive one or more messages. The one or more messages may comprise a duplication configuration parameter for a bearer associated with a first logical channel and a second logical channel. The one or more messages may comprise first configuration parameters indicating that the first logical channel is mapped to one or more first cells having one or more first priorities. The one or more messages may comprise second configuration parameters indicating that the second logical channel is mapped to one or more second cells having one or more second priorities. At 2420, a first activated cell in the one or more first cells may be selected based on the one or more first priorities. At 2430, a second activated cell in the one or more second cells may be selected based on the one or more second priorities. At 2440, a first packet corresponding to the bearer may be transmitted via the first activated cell. At 2450, a duplicate packet of the first packet may be transmitted via the second activated cell.

According to an example embodiment, the duplication configuration parameter may be for a packet data convergence protocol duplication. According to an example embodiment, the duplication configuration parameter may indicate that the bearer is configured with duplication. According to an example embodiment, the bearer may be a data radio bearer. According to an example embodiment, the bearer may be a signaling radio bearer. According to an example embodiment, the first activated cell may have a highest priority in one or more third activated cells of the one or more first cells. According to an example embodiment, the second activated cell may have a highest priority in one or more fourth activated cells of the one or more second cells. According to an example embodiment, the first logical channel may deliver first data to a first radio link control entity. According to an example embodiment, the second logical channel may deliver second data to a second radio link control entity. According to an example embodiment, the bearer may be for data of a first service type having first quality of service requirements. According to an example embodiment, a control element indicating activation of duplication for the bearer may be received. According to an example embodiment, one or more control elements indicating activation of the first activated cell and activation of the second activated cell may be received.

FIG. 25 is an example flow diagram as per an aspect of an embodiment of the present disclosure. At 2510, a wireless device may receive one or more messages. The one or more messages may comprise a duplication configuration parameter for a bearer associated with a first logical channel and a second logical channel. The one or more messages may comprise first configuration parameters indicating that the first logical channel is mapped to a first cell. The one or more messages may comprise second configuration parameters indicating that the second logical channel is mapped to a second cell. At 2520, a control element indicating activation of duplication for the bearer may be received. At 2530, activation of the second cell may be maintained based on arrival or availability of data at one or more buffers associated with the second logical channel. At 2540, a first packet corresponding to the bearer may be transmitted via the first cell. At 2550, a duplicate of the first packet may be transmitted via the second cell in response to the second cell being activated.

According to an example embodiment, the maintaining of the activation of the second cell may comprise starting a timer of the second cell. According to an example embodiment, the timer may be started with a first value. According to an example embodiment, the one or more messages may indicate the first value. According to an example embodiment, the duplication may comprise packet data convergence protocol duplication. According to an example embodiment, the duplication configuration parameter may indicate that the bearer is configured with duplication. According to an example embodiment, the bearer may be a data radio bearer. According to an example embodiment, the bearer may be a signaling radio bearer. According to an example embodiment, the first logical channel may deliver first data to a first radio link control entity. According to an example embodiment, the second logical channel may deliver second data to a second radio link control entity. According to an example embodiment, the wireless device may transmit a message indicating the maintaining the activation of the second cell. According to an example embodiment, the message may comprise uplink control information. According to an example embodiment, the message may comprise a control element.

FIG. 26 is an example flow diagram as per an aspect of an embodiment of the present disclosure. At 2610, a wireless device may receive one or more messages. The one or more messages may comprise a duplication configuration parameter for a bearer associated with a first logical channel and a second logical channel. The one or more messages may comprise first configuration parameters indicating that the first logical channel is mapped to a first cell. The one or more messages may comprise second configuration parameters indicating that the second logical channel is mapped to a second cell. At 2620, a first control element indicating activation of the duplication for the bearer may be received. At 2630, a value associated with a timer of the second cell may be stored in response to receiving the first control element. At 2640, a second control element indicating deactivation of the duplication for the bearer may be received. At 2650, the timer may be started with a first value.

According to an example embodiment, the first value may be the stored value. According to an example embodiment, the one or messages may indicate the first value. According to an example embodiment, the duplication may comprise packet data convergence protocol duplication. According to an example embodiment, the duplication configuration parameter may indicate that the bearer is configured with duplication. According to an example embodiment, the bearer may be a data radio bearer. According to an example embodiment, the bearer may be a signaling radio bearer. According to an example embodiment, the first logical channel may deliver first data to a first radio link control entity. According to an example embodiment, the second logical channel may deliver second data to a second radio link control entity. According to an example embodiment, the timer may be disabled in response to receiving the first control element. According to an example embodiment, the second cell may be deactivated in response to the timer expiring.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a wireless device, one or more messages comprising:
      a duplication configuration parameter for a bearer; and
      a respective secondary cell index for each of a plurality of secondary cells for a duplicate logical channel corresponding to the bearer;
   receiving a transport block comprising a control element indicating activation of the duplication for the bearer;
   receiving a plurality of uplink grants for the plurality of secondary cells comprising a first uplink grant for a first secondary cell;
   selecting, for transmission of a duplicate packet, the first secondary cell of the plurality of cells based on a secondary cell index of the first secondary cell; and
   transmitting, via the first secondary cell and based on the first uplink grant, the duplicate packet.

2. The method of claim 1, wherein the cell is a primary secondary cell.

3. The method of claim 1, further comprising:
   interrupting, in response to receiving the control element, a cell with an uplink control channel; and
   activating one or more secondary cells of the plurality of secondary cells in response to receiving the control element.

4. The method of claim 3, wherein the interruption is in response to the activating the one or more secondary cells.

5. The method of claim 3, wherein a secondary cell in the one or more secondary cells is an intra-band secondary cell.

6. The method of claim 3, wherein a secondary cell in the one or more secondary cells is an inter-band secondary cell.

7. The method of claim 1, further comprising:
   interrupting, in response to receiving the control element, a cell with an uplink control channel; and
   receiving one or more second control elements indicating activation of one or more secondary cells, wherein data of the bearer is transmitted via the one or more secondary cells.

8. The method of claim 7, wherein the interrupting is in response to the activation of the one or more secondary cells.

9. The method of claim 7, wherein a secondary cell in the one or more secondary cells is an intra-band secondary cell.

10. The method of claim 7, wherein a secondary cell in the one or more secondary cells is an inter-band secondary cell.

11. The method of claim 1, further comprising interrupting, in response to receiving the control element, a cell with an uplink control channel, wherein the duplication is a packet data convergence protocol duplication.

12. The method of claim 11, wherein the interruption on a cell causes discontinuity in transmitting or receiving signals on the cell.

13. The method of claim 11, wherein the duplication configuration parameter for the bearer indicates that the bearer is configured with duplication.

14. The method of claim 11, wherein the bearer is a data radio bearer.

15. The method of claim 11, wherein the bearer is a signaling radio bearer.

16. The method of claim 1, further comprising interrupting, in response to receiving the control element, a cell with an uplink control channel, wherein interrupting a cell causes discontinuity in transmitting signals on the cell.

17. The method of claim 1, further comprising:
   interrupting, in response to receiving the control element, a cell with an uplink control channel; and
   transmitting, via a control channel of the cell, a hybrid automatic repeat request feedback corresponding to the transport block.

18. The method of claim 1, wherein the duplication configuration parameter indicates that the bearer is configured with duplication.

19. The method of claim 1, wherein the bearer is a data radio bearer.

20. The method of claim 1, wherein the bearer is a signaling radio bearer.

* * * * *